(12) United States Patent
Tomizawa

(10) Patent No.: US 10,490,146 B2
(45) Date of Patent: Nov. 26, 2019

(54) DISPLAY DEVICE AND IMAGE PROCESSING METHOD

(71) Applicant: Japan Display Inc., Minato-ku (JP)

(72) Inventor: Kazunari Tomizawa, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 4 days.

(21) Appl. No.: 16/018,102

(22) Filed: Jun. 26, 2018

(65) Prior Publication Data
US 2019/0051255 A1 Feb. 14, 2019

(30) Foreign Application Priority Data
Aug. 8, 2017 (JP) .................................. 2017-153040

(51) Int. Cl.
*G09G 3/36* (2006.01)
*H04N 9/64* (2006.01)

(52) U.S. Cl.
CPC ......... *G09G 3/3607* (2013.01); *G09G 3/3611* (2013.01); *H04N 9/646* (2013.01); *G09G 2310/0264* (2013.01)

(58) Field of Classification Search
CPC ............... G09G 3/3607; G09G 3/3611; G09G 2310/0264; H04N 9/646
See application file for complete search history.

(56) References Cited

U.S. PATENT DOCUMENTS

| | | | | |
|---|---|---|---|---|
| 8,207,924 B2* | 6/2012 | Horiuchi | ............... | G09G 3/2003 345/6 |
| 2018/0374437 A1* | 12/2018 | Tomizawa | ........... | G09G 3/3607 |

FOREIGN PATENT DOCUMENTS

JP 2015-197461 11/2015

* cited by examiner

*Primary Examiner* — Priyank J Shah
(74) *Attorney, Agent, or Firm* — Oblon, McClelland, Maier & Neustadt, L.L.P.

(57) ABSTRACT

A display device includes a display panel arranged with first subpixel, second subpixel and third subpixel, the second subpixel is arranged adjacent in the same row direction as the first subpixel, the third subpixel is arranged in a row adjacent to the row direction, and the third subpixel is arranged between the first subpixel and the second subpixel, and an image processing circuit converts first input image signal corresponding to the first subpixel, second input image signal corresponding to the second subpixel, third input image signal corresponding to the third subpixel, and fourth input image signal to a signal for driving a subpixel of the display panel, the fourth input image signal corresponds to any one subpixel among the first subpixel, the second subpixel and the third subpixel, and the fourth input image signal is input between the first input image signal and the second input image signal.

11 Claims, 30 Drawing Sheets

| W | G | W | G | W | G | W | G |
|---|---|---|---|---|---|---|---|
| B | R | B | R | B | R | B | R |
| G | W | G | W | G | W | G | W |
| R | B | R | B | R | B | R | B |
| W | G | W | G | W | G | W | G |
| B | R | B | R | B | R | B | R |
| G | W | G | W | G | W | G | W |
| R | B | R | B | R | B | R | B |
| W | G | W | G | W | G | W | G |
| B | R | B | R | B | R | B | R |
| G | W | G | W | G | W | G | W |
| R | B | R | B | R | B | R | B |

| W | G | W | G | W | G | W | G |
|---|---|---|---|---|---|---|---|
| B | R | B | R | B | R | B | R |
| G | W | G | W | G | W | G | W |
| R | B | R | B | R | B | R | B |
| W | G | W | G | W | G | W | G |
| B | R | B | R | B | R | B | R |
| G | W | G | W | G | W | G | W |
| R | B | R | B | R | B | R | B |
| W | G | W | G | W | G | W | G |
| B | R | B | R | B | R | B | R |
| G | W | G | W | G | W | G | W |
| R | B | R | B | R | B | R | B |

504 518 502 518

DISPLAY DEVICE AND IMAGE PROCESSING METHOD

CROSS REFERENCE TO RELATED APPLICATIONS

This application is based upon and claims the benefit of priority from the prior Japanese Patent Application No. 2017-153040, filed on Aug. 8, 2017, the entire contents of which are incorporated herein by reference.

FIELD

One embodiment of the present invention is related to a display device and an image processing method.

BACKGROUND

In recent years, the development of a display device represented by a liquid crystal display device and an organic electroluminescence display device is progressing in order to improve visibility and color reproducibility. Generally, the screen of a display device is formed by a plurality of pixels, and one pixel is formed by three subpixels each arranged with display elements corresponding to red, green and blue which are the three primary colors of light. In this way, the display device is capable of color display. For example, there is a method of increasing the number of primary colors used for display from three to four or more in the conventional method as a method of improving color reproducibility.

In the case when the number of primary colors used for a display is four, an input image signal of three primary colors is converted into an output image signal of four colors and then an image is displayed on a display device.

For example, a display device has been developed in which an image in which an input image signal is converted into two pixels of three primary colors and an output image signal is converted into one pixel of four colors is displayed.

SUMMARY

A display device includes a display panel arranged with a first subpixel, a second subpixel and a third subpixel, the second subpixel is arranged adjacent in the same row direction as the first subpixel, the third subpixel is arranged in a row adjacent to the row direction, and the third subpixel is arranged between the first subpixel and the second subpixel, and an image processing circuit converts a first input image signal corresponding to the first subpixel, a second input image signal corresponding to the second subpixel, a third input image signal corresponding to the third subpixel, and a fourth input image signal to a signal for driving a subpixel of the display panel, the fourth input image signal corresponds to any one subpixel among the first subpixel, the second subpixel and the third subpixel, and the fourth input image signal is input between the first input image signal and the second input image signal.

An image processing method includes, converting a first input image signal corresponding to a first subpixel, a second input image signal corresponding to a second subpixel, a third input image signal corresponding to a third subpixel, and a fourth input image signal to a signal for driving a subpixel of a display panel, the display panel including the first subpixel, the second subpixel and the third subpixel, the second subpixel arranged adjacent in the same row direction as the first subpixel, the third subpixel arranged in a row adjacent to the row, the third subpixel arranged between the first subpixel and the second subpixel, the fourth input image signal corresponding to any one subpixel among the first subpixel, the second subpixel and the third subpixel, and the fourth input image signal being input between the first input image signal and the second input image signal.

BRIEF DESCRIPTION OF DRAWINGS

Figure 4:
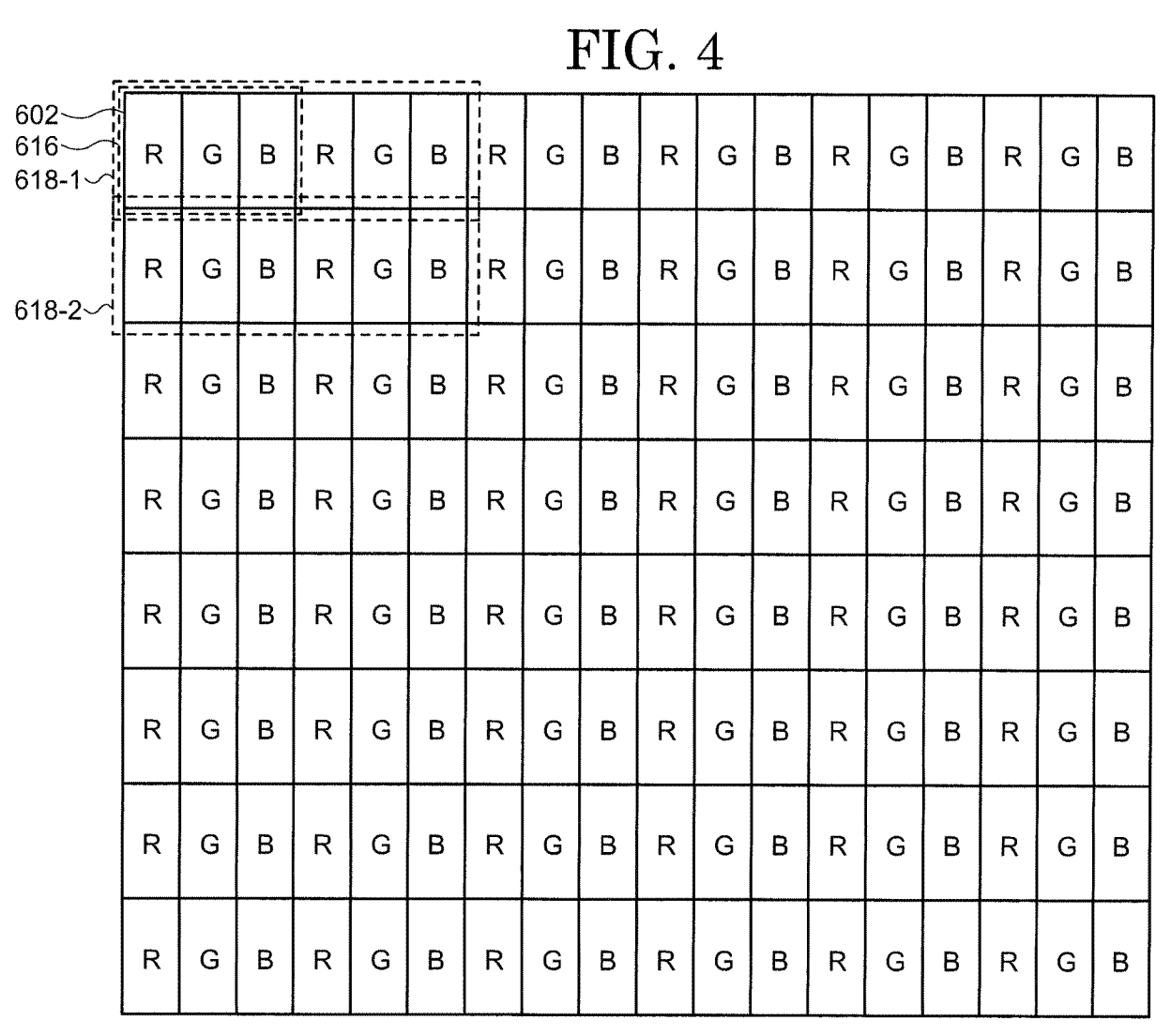

FIG. 4 is a schematic diagram showing an example of a pixel corresponding to an input image related to one embodiment of the present invention;

FIG. 5 is a schematic diagram showing an example of a pixel corresponding to an output image related to one embodiment of the present invention;

FIG. 19 is a schematic diagram showing an example of another input image related to one embodiment of the present invention is not performed;

FIG. 20 is a schematic diagram showing an example of another output image related to one embodiment of the present invention is not performed;

DESCRIPTION OF EMBODIMENTS

Figure 1:
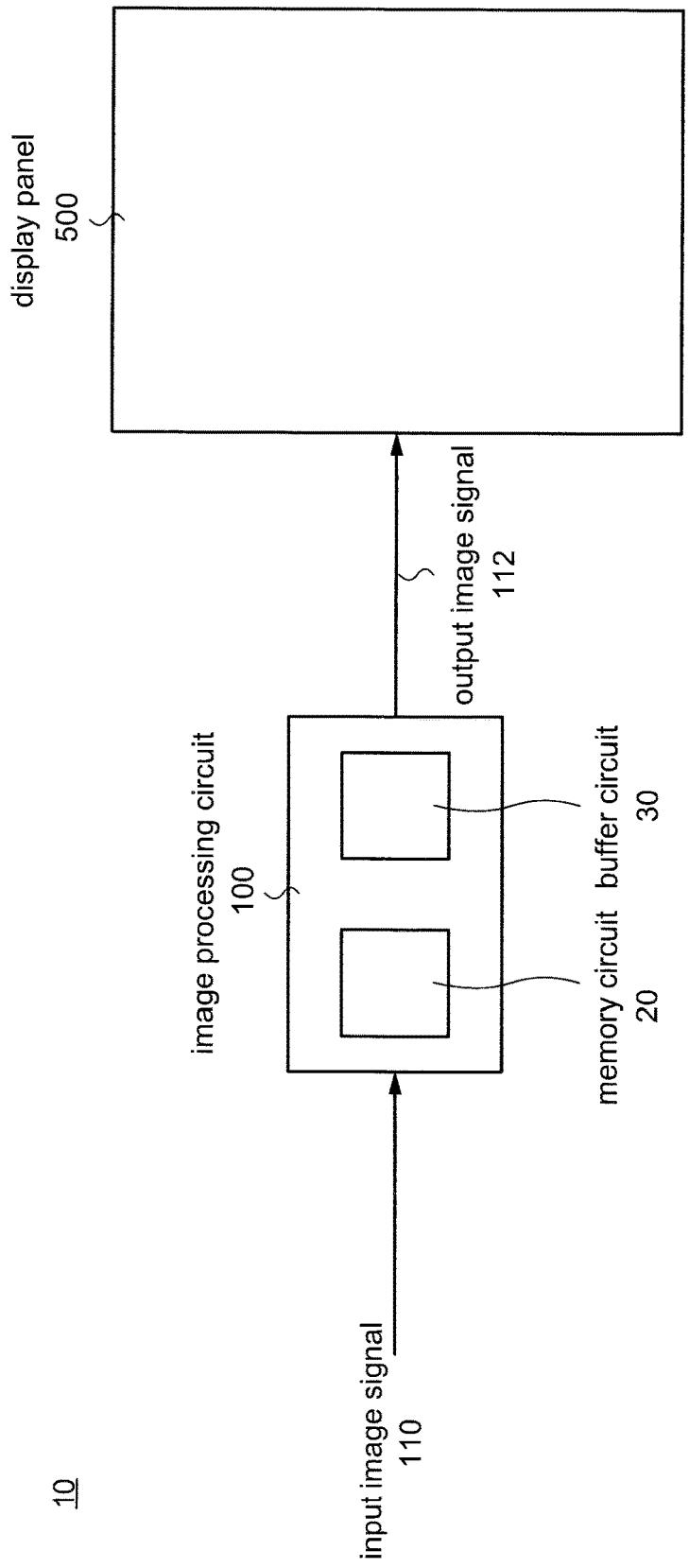
FIG. 1 is a schematic diagram showing a structure of a display device related to one embodiment of the present invention.

The embodiments of the present invention are explained below while referring to the drawings. However, the present invention can be carried out in many different modes and is not to be interpreted as being limited to the description of the embodiments exemplified herein. In addition, although the structure of each part may be schematically represented compared with their actual form in order to make the explanation clearer, such explanation is only an example and does not limit an interpretation of the present invention. Furthermore, in the present specification and each diagram, elements similar to those described above with reference to a previously mentioned figure are denoted with the same reference numerals (or reference numerals followed by numerals such as a and b) and a detailed explanation may be omitted as appropriate. Furthermore, letters added with "first" and "second" with respect to each element are convenience signs used to distinguish each element and do not have a further meaning unless otherwise specified.

For example, in the case of displaying an image in which an input image signal has two pixels of three primary colors converted to one pixel of four colors by an output image signal, the visibility of the display device may be lost.

In a number of embodiments described below, a display device and an image processing method with high visibility are exemplified.

First Embodiment

In the present embodiment, the structure of a display device according to one embodiment of the present invention is explained.

FIG. 1 is a schematic diagram showing a structure of a display device 10 according to one embodiment of the present invention. The display device 10 includes, for example, an image processing circuit 100 and a display panel 500.

The image processing circuit 100 includes at least a memory circuit 20 and a buffer circuit 30. The image processing circuit 100 is input with an input image signal 110 and outputs an output image signal 112. The image processing circuit 100 converts the input image signal 110 into an image signal to be displayed on the display panel 500. The image signal displayed on the display panel 500 is the output image signal 112. The memory circuit 20 stores the input image signal 110. The input image signal 110 includes image data to be displayed on a plurality of pixels of the display panel. When the memory circuit 20 stores the input image signal 110, versatility can be provided to image processing such as processing a plurality of image data one by one or collectively processing a plurality of image data. Furthermore, the memory circuit 20 is a nonvolatile memory such as a flash memory, for example. The buffer circuit 30 amplifies the input image signal 110 which is read from the memory circuit 20. In addition, the buffer circuit 30 can also form a signal waveform of the input image signal 110. By including the buffer circuit 30, the image processing circuit 100 can transfer a signal which does not have a dull waveform to the display panel 500. In addition, by providing the image processing circuit 100 with the buffer circuit 30, a signal having a minimized delay can be transferred to the display panel 500.

Figure 2:
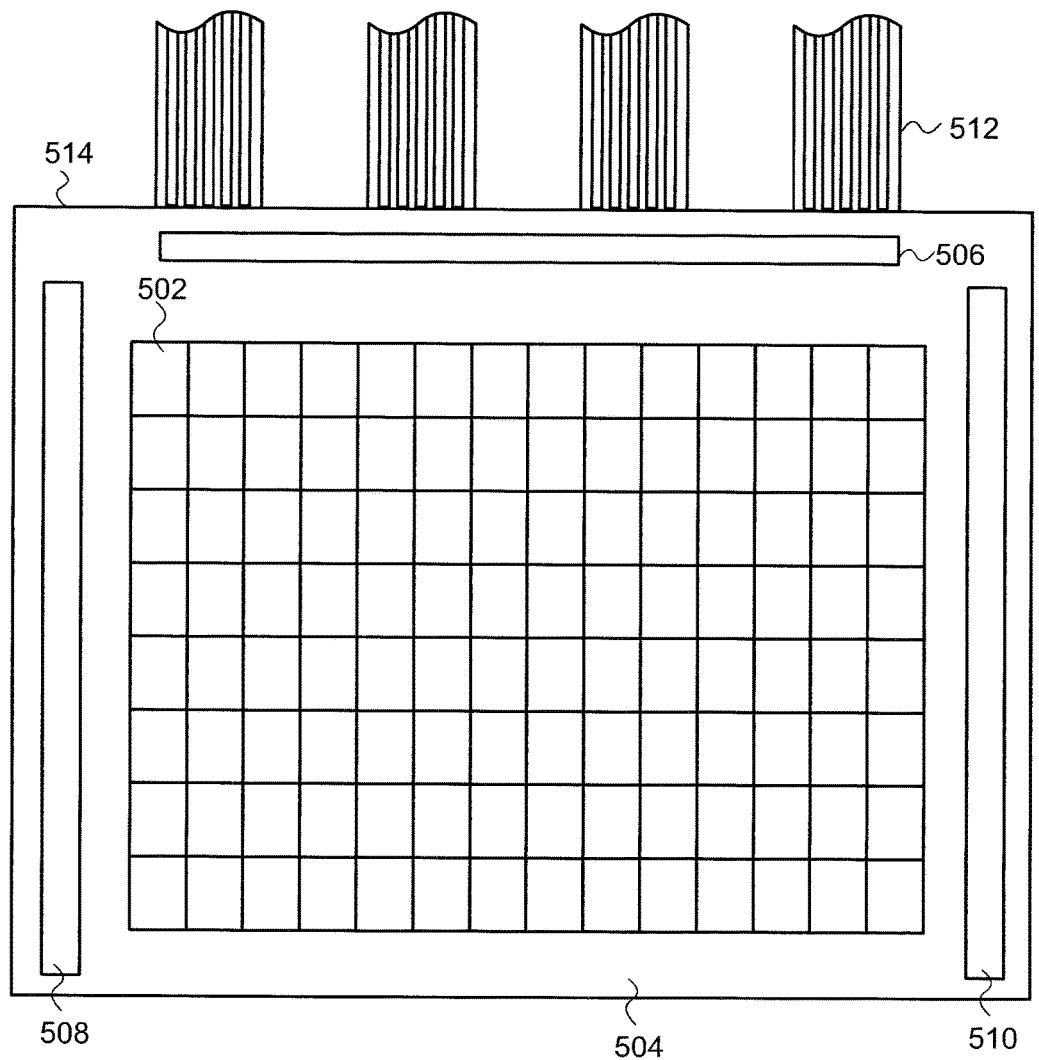
FIG. 2 is a schematic diagram showing a display panel in a display device related to one embodiment of the present invention.

FIG. 2 is a schematic diagram showing a display panel 500 included in the display device 10 according to one embodiment of the present invention. The display panel 500 includes a substrate 514, a display region 504, an image signal line drive circuit 506, scanning signal line drive circuits 508 and 510, and a connector 512.

The display region 504, image signal line drive circuit 506, and scanning signal line drive circuits 508 and 510 are formed on the substrate 514. The connector 512 is connected to the substrate 514. The image signal line drive circuit 506, the scanning signal line drive circuit 508, and the scanning signal line drive circuit 510 may not all be formed on the substrate 514. For example, an integrated circuit (IC) (not shown in the diagram) including a part of or all of the image signal line drive circuit 506, the scanning signal line drive circuit 508 and the scanning signal line drive circuit 510 may be formed on the substrate 514 or may be arranged on the connector 512.

The substrate 514 may be a hard base material such as a glass substrate or a substrate having flexibility. A hard base material such as a glass substrate can include materials exemplified by, for example, a glass substrate, a quartz substrate and a ceramic substrate. By using a hard base material such as a glass substrate for the substrate 514, the display panel 500 having high rigidity is provided. A base material having flexibility can include, for example, a material selected from polymer materials exemplified by polyimide, polyamide, polyester and polycarbonate. By using a flexible base material for the substrate 514, a light and thin display panel 500 is provided.

The display region 504 includes a plurality of pixels 502. The plurality of pixels 502 are arranged along a first direction a second direction intersecting the first direction. The number of the plurality of pixels 502 is arbitrary. For example, m pixels 502 are arranged in a X direction and n pixels 502 in a Y direction. m and n are each independently a natural number larger than 1. In the display region 504, the pixels 502 are arranged along a first direction and a second direction intersecting the first direction. Each of the pixels 502 has a display element. The display element includes, for example, a liquid crystal element or an organic EL element.

Figure 3:
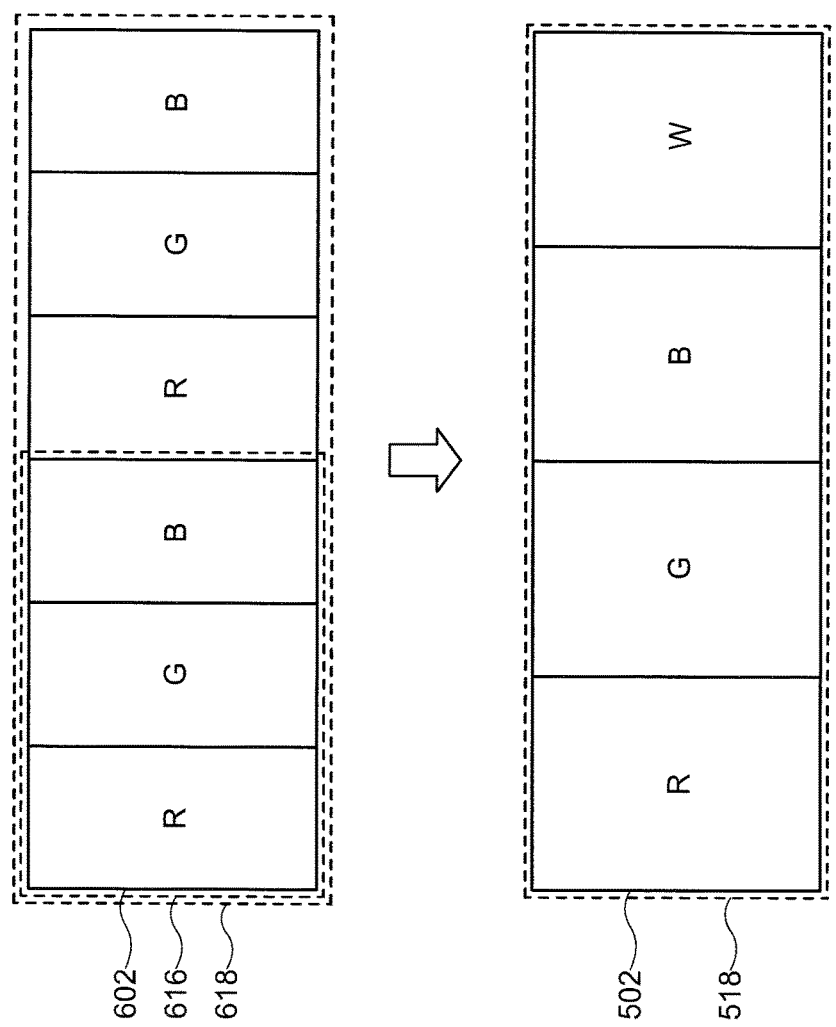
FIG. 3 is a schematic diagram showing a pixel corresponding to an input image and a pixel corresponding to an output image related to one embodiment of the present invention.

FIG. 3 is a schematic diagram showing a pixel corresponding to an input image and a pixel corresponding to an output image according to one embodiment of the present invention. In the display device according to one embodiment of the present invention, one pixel 616 corresponding to an input image is formed from three subpixels 602. One pixel 616 is formed from subpixels corresponding to the respective colors of red (R), green (G) and blue (B) which are the so-called three primary colors of light. One pixel 518 corresponding to an output image is formed from subpixels corresponding to the respective colors of red (R), green (G), blue (B), and white (W). In addition, in one pixel 518 corresponding to an output image, the distance between subpixels is constant and uniformly arranged in each direction in the row direction and the column direction of the display region. In particular, the distances between subpixels corresponding to green (G) and white (W) having high luminosity are evenly arranged. That is, in the same row, a green subpixel is arranged at the center between a white subpixel and a white subpixel adjacent to this white subpixel. In the display device according to one embodiment of the present invention, an input image signal of two pixels (two pixels 618 corresponding to an input image signal) of three primary colors is converted into an output image signal of one pixel of four colors (one pixel 518 corresponding to an output image). In addition, an image corresponding to the output image signal is displayed in the display device according to one embodiment of the present invention. That is, in the display device according to one embodiment of the present invention, the input image signal has a total of six signals of two signals of each color in the three primary colors. In addition, an output image signal has four different color signals. For example, while the input image signal includes two red color signals, the output image signal includes one red signal.

Image processing according to one embodiment of the present invention is explained while referring to FIG. 4 to FIG. 15. FIG. 4 is a schematic diagram showing an example of pixels corresponding to an input image. The arrangement of the pixels corresponding to the input image is a stripe arrangement. In addition, the arrangement of the pixels on odd rows and even rows is the same. That is, two pixels 618-1 corresponding to an input image signal of the first row and two pixels 618-2 corresponding to an input image signal of the second row have repeated arrangements of red (R), green (G) and blue (B) subpixels twice.

FIG. 5 is a schematic diagram showing an example of a pixel corresponding to an output image according to one embodiment of the present invention. The example of the pixel shown in FIG. 5 corresponds to the display region 504 of the display panel 500. In FIG. 5, although the arrangement of the pixels corresponding to the output image is a stripe arrangement, the arrangement of the pixels on odd numbered rows and even numbered rows is different. In one pixel 518-1 corresponding to an odd numbered row, the subpixels are arranged in the order red (R), green (G), blue (B) and white (W).

In one pixel 518-2 corresponding to an even numbered row, subpixels are arranged in the order blue (B), white (W), red (R) and green (G). For example, the red (R) subpixel of an even numbered row is arranged between a red (R) subpixel of an odd numbered row adjacent to the even numbered row and a red (R) subpixel adjacent to a red (R) subpixel of that odd numbered row on the same row as the red (R) subpixel of that odd numbered row.

Figure 6:
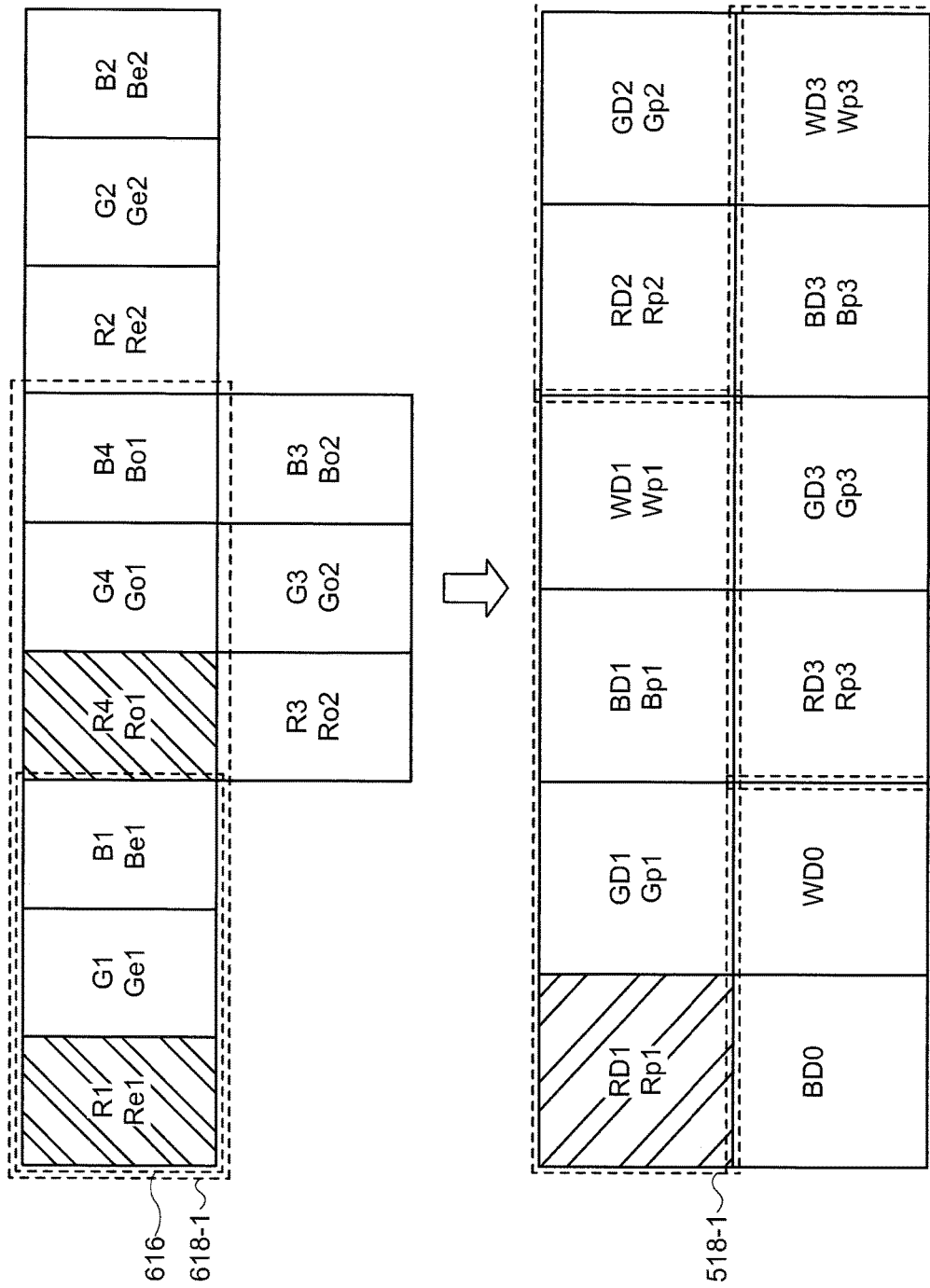
FIG. 6 is a schematic diagram showing a pixel corresponding to an input image and a pixel corresponding to an output image related to one embodiment of the present invention.

FIG. 6 is a schematic diagram showing a pixel corresponding to an input image and a pixel corresponding to an output image according to one embodiment of the present invention. FIG. 6 shows an example in which two pixels 618-1 corresponding to an input image signal are converted into one pixel 518-1 corresponding to an output image. In addition, FIG. 6 shows an example in which two subpixels corresponding to a red input image signal are converted into one subpixel corresponding to a red output image. Furthermore, similar to a red input image signal, conversion to an output image is performed even in a green input image signal and a blue input image.

In FIG. 6, in a pixel corresponding to an input image, a subpixel to be switched ON is indicated by hatching with right diagonal lines. In addition, in FIG. 6, in a pixel corresponding to an output image, a subpixel to be switched ON is indicated by hatching with left diagonal lines.

Second pixels (RD2 and GD2 are shown and BD2 and WD2 are omitted) are arranged adjacent in the same row direction as first pixels (RD1, GD1, BD1 and WD1). Third pixels (RD3, GD3, BD3 and WD3) are arranged between the first pixel and the second pixel on a row adjacent to the row where the first pixel and the second pixel are arranged.

A red subpixel of the first pixel is RD1. A first input pixel corresponding to RD1 is R1. A first input image signal of R1 is Re1. A green subpixel of the first pixel is GD1. A first input pixel corresponding to GD1 is G1. A first input image signal of G1 is Ge1. A blue subpixel of the first pixel is BD1. A first input pixel corresponding to BD1 is B1. A first input image signal of B1 is Be1.

A second input pixel corresponding to RD2 in which a red subpixel of the second pixel is RD2 is R2. A second input image signal of R2 is Re2. A green subpixel of the second pixel is GD2. A second input pixel corresponding to GD2 is G2. A second input image signal of G2 is Ge2. A blue subpixel of the second pixel is BD2 (not shown in the diagram). A second input pixel corresponding to BD2 is B2. A second input image signal of B2 is Be2.

A red subpixel of the third pixel is RD3. A third input pixel corresponding to RD3 is R3. A third input image signal of R3 is Ro2. A green subpixel of the third pixel is GD3. A third input pixel corresponding to GD3 is G3. A third input image signal of G3 is Go2. A blue subpixel of the third pixel is BD3. A third input pixel corresponding to BD3 is B3. A third input image signal of B3 is Bo3.

In a fourth input pixel, the red pixel is R4. A fourth input image signal corresponding to R4 is Ro1. In the fourth input pixel, the green pixel is G4. A fourth input image signal corresponding to G4 is Go1. In the fourth input pixel, the blue pixel is B4. A fourth input image signal corresponding to B4 is Bo1. The fourth input pixel does not correspond to either the first pixel, the second pixel or the third pixel. The fourth input pixel also does not correspond to a subpixel of either the first pixel, the second pixel or the third pixel. The fourth input image signal is different from any of the input image signals of the first input image signal, the second input image signal and the third input image signal. The fourth input image signal is input between the first input image signal and the second input image signal. That is, the input image signal is transferred in the order of the first input image signal, the fourth input image signal, the second input image signal and the third input image signal, and then input to the image processing circuit 100.

Figure 7:
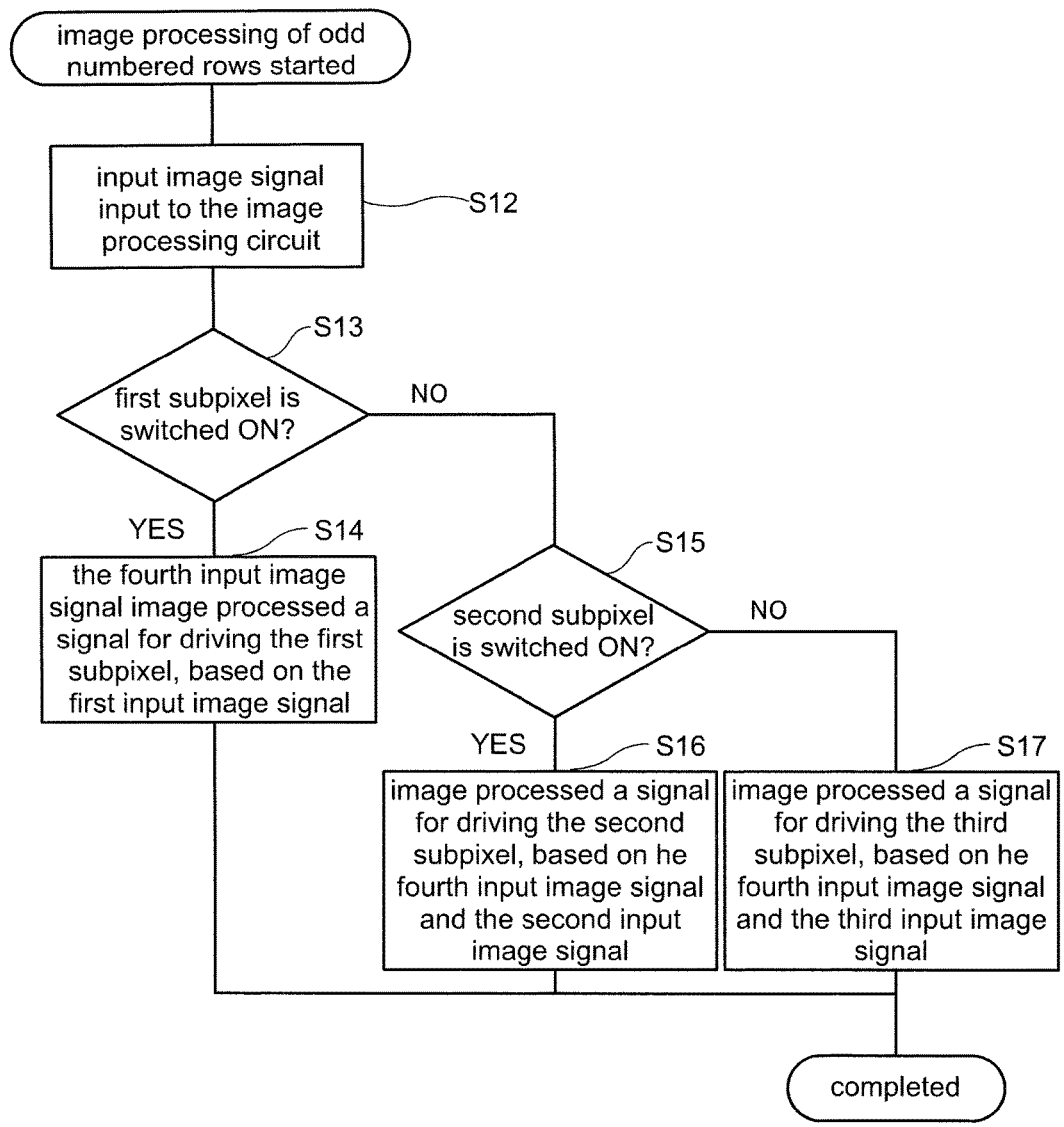
FIG. 7 is schematic diagram showing a flowchart for explaining an image processing method related to one embodiment of the present invention.

FIG. 7 is a schematic diagram showing a flowchart explaining an image processing method according to one embodiment of the present invention. In one embodiment of the present invention, it is assumed that each pixel converts an input image signal of two pixels in three primary colors into a signal which is displayed in one pixel when each pixel has four colors. In addition, it is assumed that the fourth input image signal is a signal for turning on a pixel. Next, the image processing circuit makes the fourth input image signal correspond to any one of the first subpixel, the second subpixel and the third subpixel. In addition, the image processing circuit converts the fourth input image signal into a signal for driving a subpixel of the display panel based on the fourth input image signal and an input image signal corresponding to any one pixel. Furthermore, similar to the explanation in FIG. 6, one pixel having four colors for each pixel is an output pixel.

First, image processing of odd numbered lines displayed on the display panel is started. For example, image processing of an image displayed on the first row of the display panel is started. Next, an input image signal 110 is input to the image processing circuit 100 (step 12 (S12)). The input image signal 110 is stored in the memory circuit 20, and when image processing is started, the input image signal may be read from the memory circuit 20 and the input image signal may be processed. If the input image signal 110 is not stored in the storage circuit 20 and image processing is started, the image data included in the input image signal 110 may be processed one by one.

Next, it is judged whether or not the first input image signal corresponding to a first subpixel is a signal for switching ON the first subpixel (step 13 (S13)).

When the first input image signal corresponding to the first subpixel is a signal for switching ON the first sub pixel (YES in S13), the first input image signal is image processed into a signal for driving the first subpixel (step 14 (S14)). In S14, the fourth input image signal which does not correspond to any subpixel is image processed into a signal for driving the first subpixel, based on the fourth input image signal and the first input image signal. In one embodiment of the present invention, an input image signal corresponding to two pixels of three primary colors corresponds to a first input image signal and a fourth input image signal.

Next, when the first input image signal corresponding to the first subpixel is a signal which does not switch ON the first subpixel (NO in S13), a judgement is made whether the second input image signal corresponding to the second subpixel is a signal for switching ON the second subpixel (step 15 (S15)).

When the second input image signal corresponding to the second subpixel is a signal for switching ON the second subpixel (YES in S15), the second input image signal is image processed into a signal for driving the second subpixel (step 16 (S16)). In S16, based on the fourth input image signal which does not correspond to any subpixel and the second input image signal, the fourth input image signal is image processed into a signal for driving the second subpixel.

When the second input image signal corresponding to the second subpixel is a signal that does not switch ON the second subpixel (NO in S15), the third input image signal corresponding to the third subpixel is image processed into a signal for driving the third subpixel (step 17 (S17)). In S17, the fourth input image signal which does not correspond to any subpixel is image processed into a signal for driving the third subpixel, based on the fourth input image signal and the third input image signal. Furthermore, in S17, the third input image signal corresponding to the third subpixel may be a signal to switch ON the third subpixel or even a signal which does not switch ON the third subpixel.

When image processing for one pixel is completed, the steps S13 to S17 are performed for adjacent subpixels on the same row, and when image processing is performed on all the subpixels in the same odd numbered row, image processing is completed.

In the flowchart shown in FIG. 7, the case where the fourth input image signal is a signal for switching ON a subpixel was explained. The first input image signal, the second input image signal and the third input image signal are signals that do not switch ON any subpixels, and in the case where the fourth input image signal is also a signal that does not switch ON a subpixel, a signal that does not switch ON any subpixel is image processed into a signal that drives each of the corresponding subpixels.

S13 and S14 in FIG. 7 are explained using FIG. 6 taking a red pixel as an example. When Re1 corresponding to RD1 is a signal for switching ON RD1, Re1 is image processed into a signal for driving RD1. Here, since Ro1 is a signal for switching ON R4, Ro1 is image processed into a signal for driving a first pixel based on Ro1 and Re1. Here, the image processed signal is Rp1. For example, Re1 and Ro1 have numerical data representing the luminosity of a pixel, half of each numerical value of the luminosity may be added and image processing may be performed to a signal for driving RD1. Furthermore, a green subpixel and a blue subpixel may be subjected to image processing in the same way as a red subpixel.

Furthermore, when Re1 which corresponds to RD1 is a signal for turning on RD1 and Re2 which corresponds to RD2 is a signal for switching ON RD2, half of the numerical data representing the luminosity of Re1 and half of the numerical data representing the luminosity of Ro1 may be added and image processing may be performed on the signal for driving RD1. At this time, half of the numerical data representing the luminosity of Re2 and half of the numerical data representing the luminosity of Ro1 may be added and image processing may be performed on the signal for driving RD2.

Figure 8:
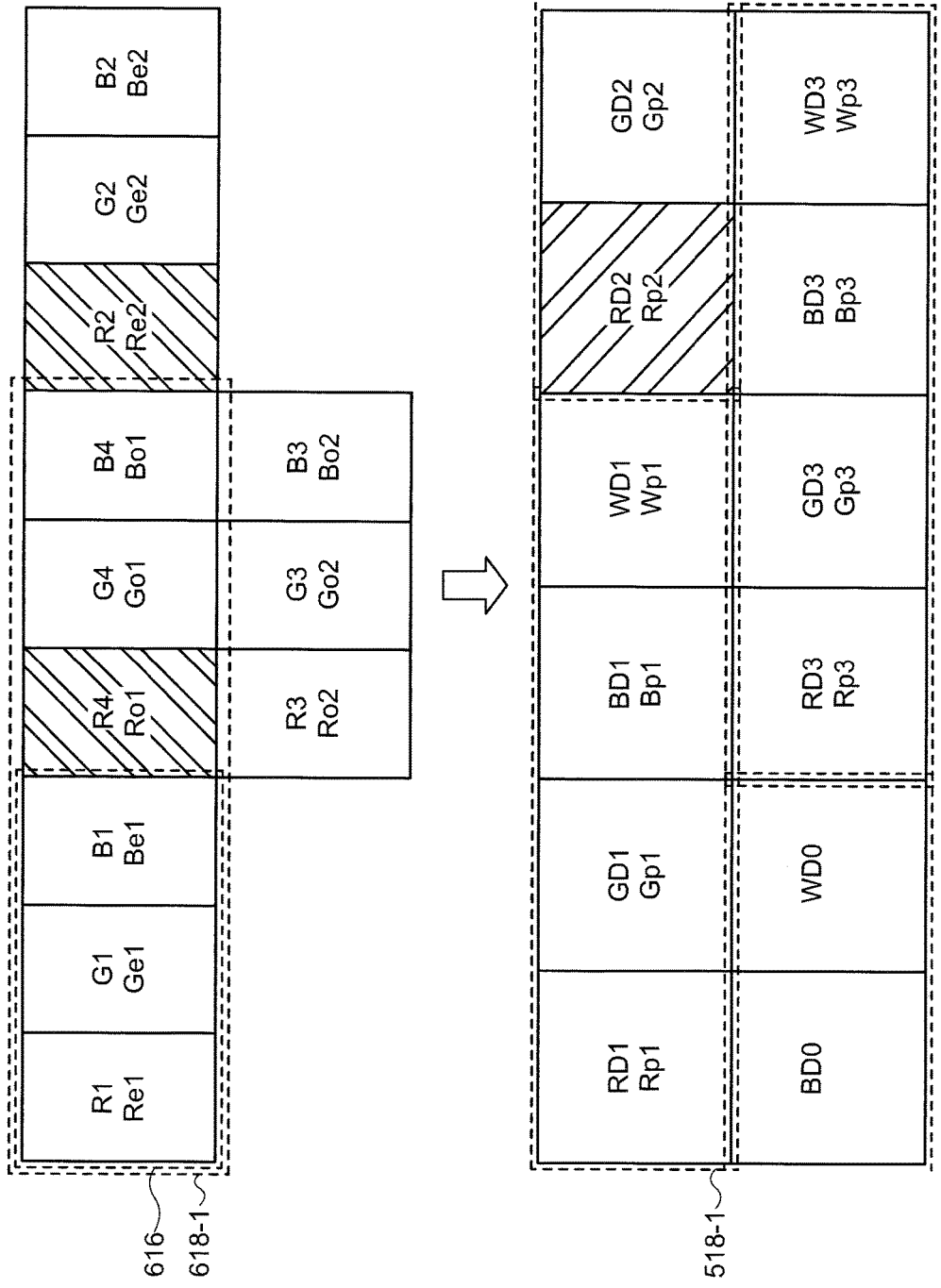
FIG. 8 is a schematic diagram showing a pixel corresponding to an input image and a pixel corresponding to an output image related to one embodiment of the present invention.

In FIGS. 8, S15 and S16 in FIG. 7 are explained using a red pixel as an example. Furthermore, the pixels to be switched ON are different between FIG. 8 and FIG. 6. An explanation of the same structure as in FIG. 7 is omitted here. In FIG. 8, in a pixel corresponding to an input image, a pixel to be switched ON is indicated by hatching with right diagonal lines. In addition, in FIG. 8, in a pixel corresponding to an output image, a pixel to be switched ON is indicated by hatching with left diagonal lines. When Re1 which corresponds to RD 1 is a signal which does not switch ON RD1 and Re2 which corresponds to RD2 is a signal which switches ON RD2, Re2 is subjected to image processing into a signal for driving RD2. Here, since Ro 1 is a signal for switching ON R4, and image processing is performed on a signal for driving RD2 based on Ro1 and Re2. Here, the signal which is image processed is Rp2. For example, Re2 and Ro1 have numerical data representing the luminosity of the pixels, and half of each numerical value of the luminosity may be added and subjected to image processing to a signal for driving RD2. Furthermore, a green subpixel and a blue subpixel may be subjected to image processing in the same way as a red subpixel.

Figure 9:
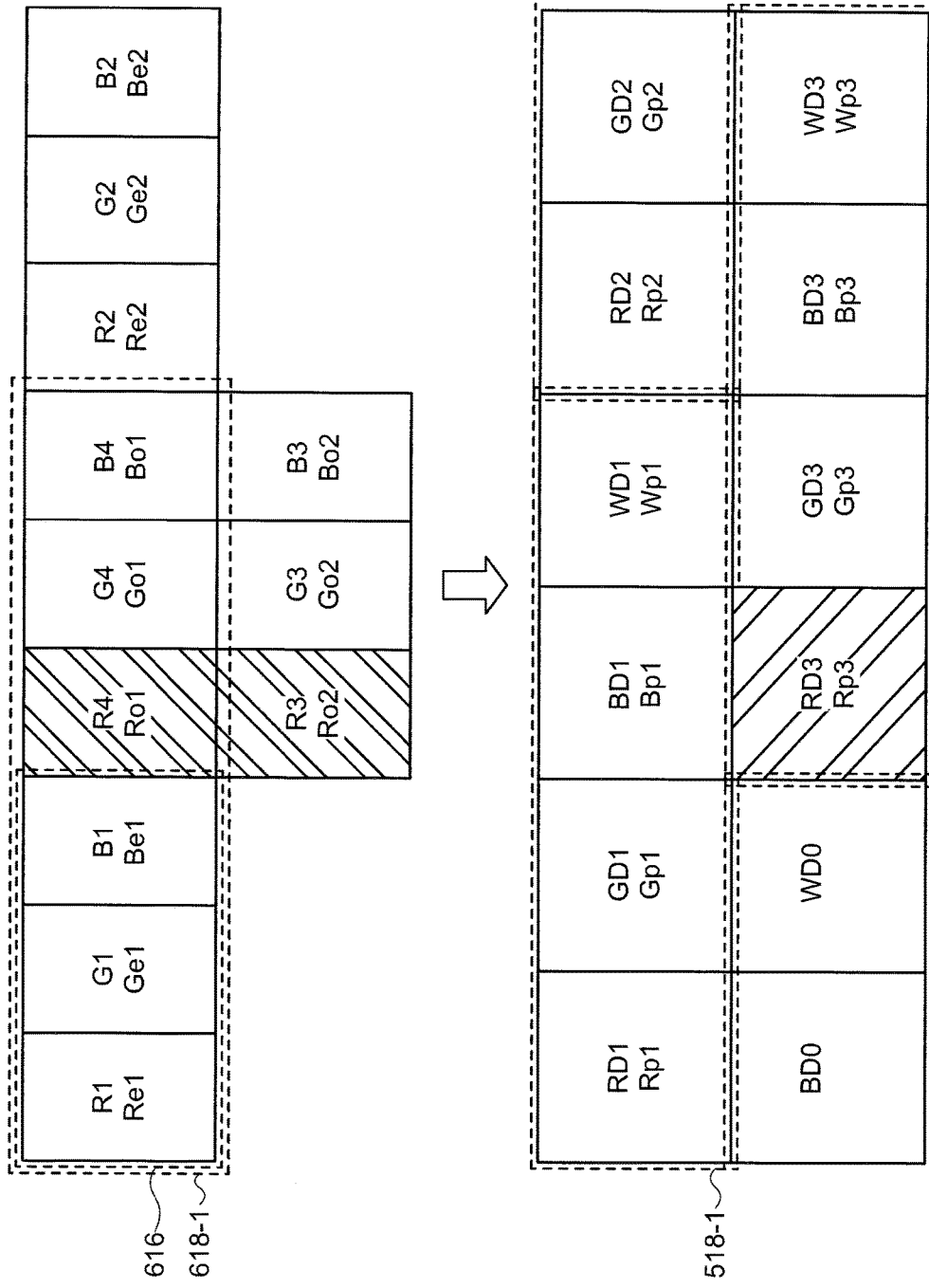
FIG. 9 is a schematic diagram showing a pixel corresponding to an input image and a pixel corresponding to an output image related to one embodiment of the present invention.
Figure 10:
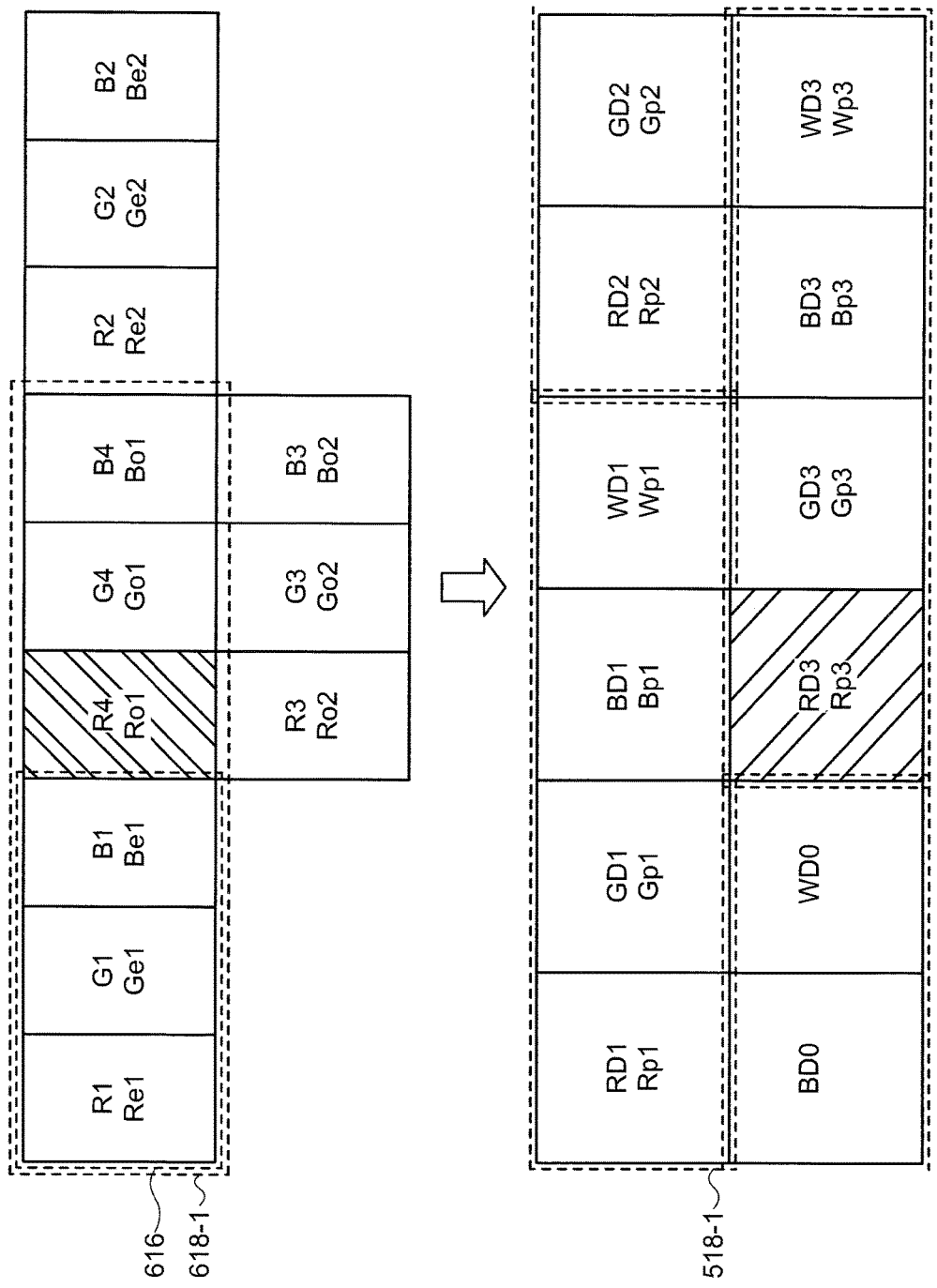
FIG. 10 is a schematic diagram showing a pixel corresponding to an input image and a pixel corresponding to an output image related to one embodiment of the present invention.

In FIG. 9 and FIG. 10, S17 in FIG. 7 is explained using a red pixel as an example. Furthermore, pixels to be switched ON are different between FIG. 9 and FIG. 10, FIG. 6. An explanation of the same structure as in FIG. 7 is omitted here. In FIG. 9 and FIG. 10, pixels to be switched ON are indicated by hatching with right diagonal lines in pixels corresponding to an input image. In addition, in FIG. 9 and FIG. 10, pixels to be switched ON are indicated by hatching with left diagonal lines in the pixels corresponding to an output image. FIG. 9 shows an example in which R3 is switched ON and FIG. 10 shows an example in which R3 is not switched ON. When Re1 corresponding to RD1 is a signal which does not switch ON RD1 and Re2 corresponding to RD2 is a signal which does not switch ON RD2, Ro2 is subjected to image processing into a signal for driving RD3. Here, since Ro1 is a signal for switching ON R4, image processing is performed to a signal for driving RD3 based on Ro1 and Ro2. Here, the signal to be image processed is Rp3. For example, Ro2 and Ro1 have numeric data representing the luminosity of a pixel, half of each numerical value of the luminosity is added and image processing may be performed on a signal for driving RD2. Furthermore, a green subpixel and a blue subpixel may be subjected to image processing in the same way as a red subpixel. In FIG. 9 and FIG. 10, RD3 was explained using the case where it is a subpixel of a row adjacent to the bottom of the row where RD1 and RD2 are arranged as an example. RD3 is not limited to this example. For example, RD3 may be a subpixel of a row adjacent above the row where RD1 and RD2 are arranged.

Figure 11:
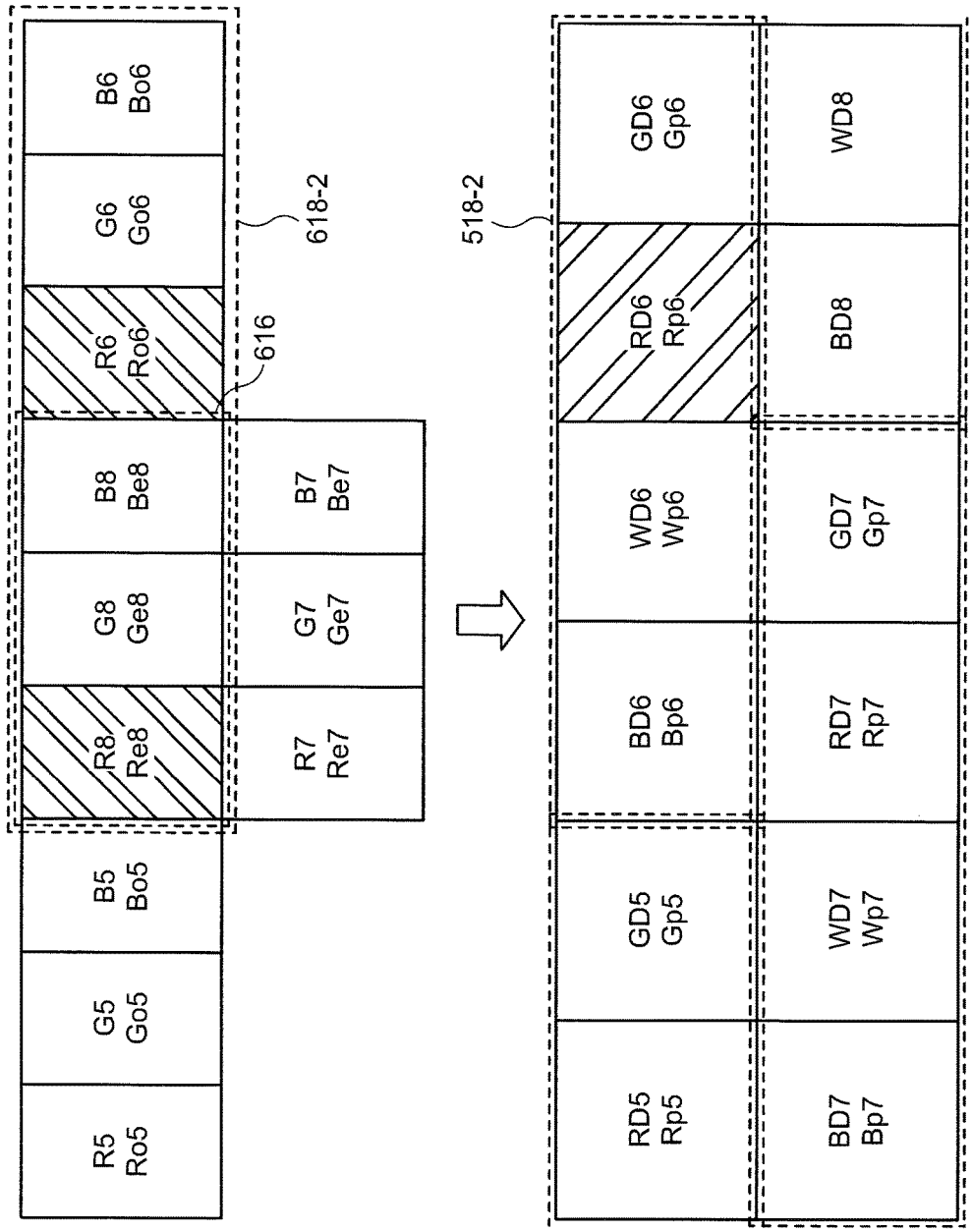
FIG. 11 is a schematic diagram showing a pixel corresponding to an input image and a pixel corresponding to an output image related to one embodiment of the present invention.

FIG. 11 is a schematic diagram showing a pixel corresponding to an input image and a pixel corresponding to an output image according to one embodiment of the present invention. FIG. 11 is a schematic diagram for explaining image processing of even numbered rows, and an explanation of the same structure as in FIG. 6 which is a schematic diagram for explaining image processing of odd numbered rows is omitted.

A red subpixel of the fifth pixel is RD5. The fifth input pixel corresponding to RD5 is R5. The fifth input image signal of R5 is Ro5. A green subpixel of the fifth pixel is GD5. The fifth input pixel corresponding to GD5 is G5. The fifth input image signal of G5 is Go5. A blue subpixel of the fifth pixel is BD5. The fifth input pixel corresponding to BD5 is B5. The fifth input image signal of B5 is Bo5.

A red subpixel of the sixth pixel is RD6. The sixth input pixel corresponding to RD6 is R6. The sixth input image signal of R6 is Ro6. A green subpixel of the sixth pixel is GD6. The sixth input image corresponding to GD6 is G6. The sixth input image signal is Go6. A blue subpixel of the sixth pixel is BD6. The sixth input pixel corresponding to BD6 is B6. The sixth input image signal of B6 is Bo6.

A red subpixel of the seventh pixel is RD7. The seventh input pixel corresponding to RD 7 is R7. The seventh input image signal of R7 is Re7. A green subpixel of the seventh pixel is GD7. The seventh input pixel corresponding to GD7 is G7. The seventh input image signal of G7 is Ge7. A blue subpixel of the seventh pixel is BD7. The seventh input pixel corresponding to BD7 is B7. The seventh input image signal of B7 is Be7.

In an eighth input pixel, a red pixel is R8. The eighth input image signal corresponding to R8 is Re8. In the eighth input pixel, a green pixel is G8. The eighth input image signal corresponding to G8 is Ge8. In the eighth input pixel, a blue pixel is B8. The eighth input image signal corresponding to B8 is Be8. The eighth input pixel does not correspond to any of the pixels of the fifth pixel, the sixth pixel and the seventh pixel. The eighth input pixel does not correspond to any of the subpixels of the fifth pixel, the sixth pixel and the seventh pixel. The eighth input image signal is different from any of the input image signals of the fifth input image signal, the sixth input image signal and the seventh input image signal. The eighth input image signal is input between the fifth input image signal and the sixth input image signal. That is, the input image signal is transferred in the sequence of the fifth input image signal, the eighth input image signal, the sixth input image signal, and the seventh input image signal and then input to the image processing circuit 100.

Figure 12:
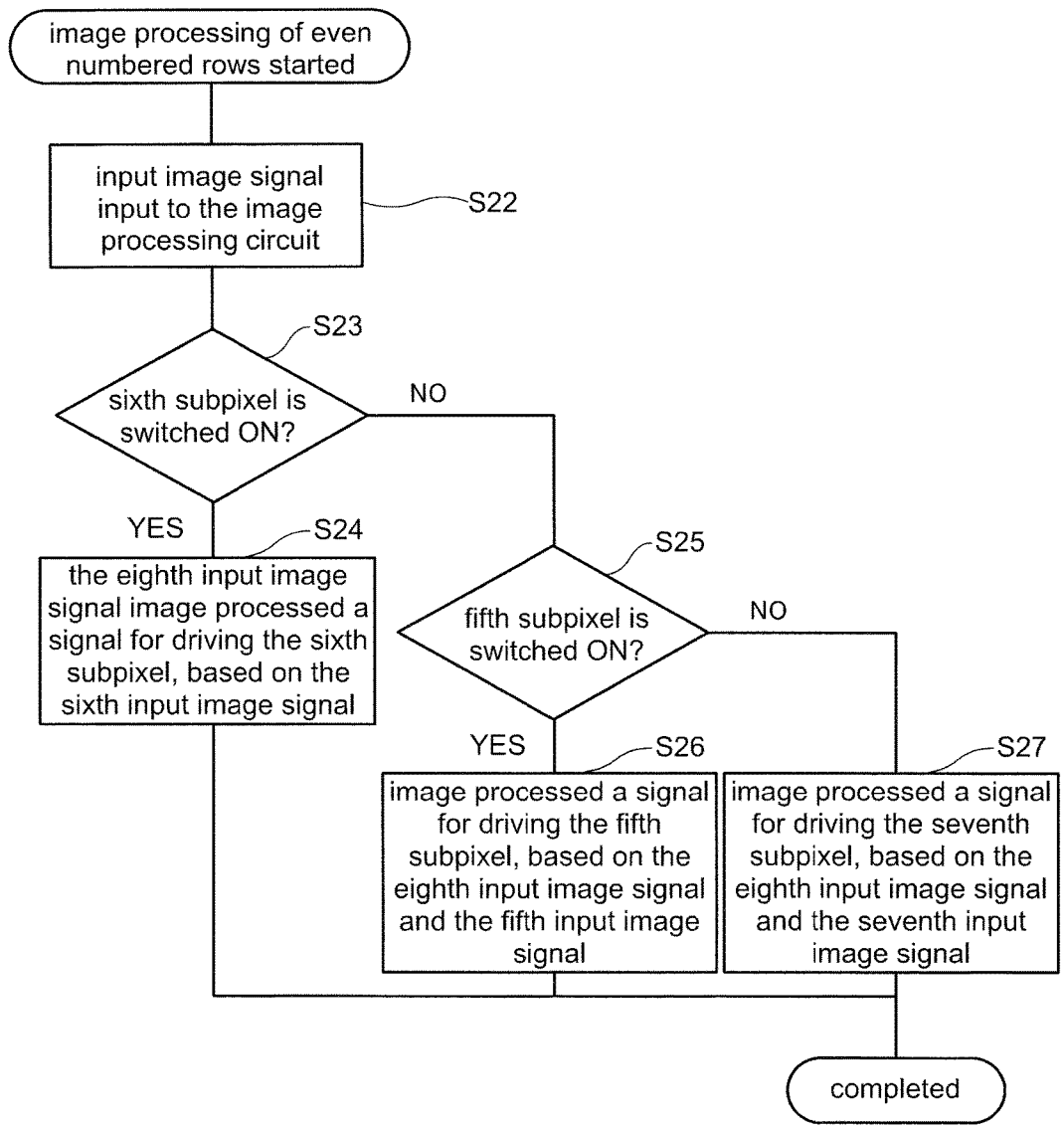
FIG. 12 is schematic diagram showing a flowchart for explaining an image processing method related to one embodiment of the present invention.

FIG. 12 is a schematic diagram showing a flowchart for explaining an image processing method according to one embodiment of the present invention. The assumed conditions can be explained by replacing the fourth input image signal in the explanation of FIG. 7 with the eighth input image signal. The explanation of the assumed conditions is omitted here. Next, the image processing circuit makes the eighth input image signal correspond to any one of the fifth subpixel, the sixth subpixel and the seventh subpixel. In addition, the image processing circuit converts the eighth input image signal into a signal for driving a subpixel of the display panel based on the eighth input image signal and an input image signal corresponding to any one of the subpixels.

First, image processing of even numbered rows displayed on the display panel is started. For example, image processing of an image displayed on the second row of the display panel is started. Next, the input image signal 110 is input to the image processing circuit 100 (step 22 (S22)). The input image signal 110 is stored in the memory circuit 20, and when image processing is started, the input image signal may be read from the memory circuit 20 and the input image signal may be processed. If image processing is started but the input image signal 110 is not stored in the memory circuit 20, then the image data included in the input image signal 110 may be processed one by one. In addition, in the case where the processing of even numbered rows is performed following the processing of odd numbered rows, the input image signal 110 is already input and the input image signal 110 is stored in the memory circuit 20, then S22 does not need to be performed.

Next, it is judged whether or not the sixth input image signal corresponding to the sixth subpixel is a signal for switching ON the sixth subpixel (step 23 (S23)). When the sixth input image signal corresponding to the sixth subpixel is a signal for switching ON the sixth subpixel (YES in S23), the sixth input image signal is image processed into a signal for driving the sixth subpixel (step 24 (S24)). In S24, the eighth input image signal which does not correspond to any subpixel is image processed into a signal for driving the sixth subpixel, based on the eighth input image signal and the sixth input image signal. In one embodiment of the present invention, input image signals corresponding to two pixels of three primary colors correspond to the sixth input image signal and the eighth input image signal. Furthermore, the eighth input image signal is a signal for switching ON subpixels.

Next, when the sixth input image signal corresponding to the sixth subpixel is a signal that does not switch ON the sixth subpixel (NO in S23), then the fifth input image signal corresponding to the fifth subpixel is a signal for switching ON the fifth subpixel (step 25 (S25)).

When the fifth input image signal corresponding to the fifth subpixel is a signal for switching ON the fifth subpixel (YES in S25), the fifth input image signal is image processed into a signal for driving the fifth subpixel (step 26 (S26)). In S26, based on the eighth input image signal which does not correspond to any subpixel and the fifth input image signal, the eighth input image signal is image processed into a signal for driving the fifth subpixel.

When the fifth input image signal corresponding to the fifth subpixel is a signal that does not switch ON the fifth subpixel (NO in S25), the seventh input image signal corresponding to the seventh subpixel is image processed into a signal for driving the seventh subpixel (step 27 (S27)). In S27, the eighth input image signal which does not correspond to any subpixel is image processed into a signal for driving the seventh subpixel, based on the eighth input image signal and the seventh input image signal. Furthermore, in S27, the seventh input image signal corresponding to the seventh subpixel may be a signal for switching ON the seventh subpixel, or a signal in which does not switch ON the seventh subpixel.

When image processing of one subpixel is completed, steps S23 to S27 are performed for the adjacent subpixels in the same row. When image processing is performed on all of the subpixels in the same even numbered row, image processing is completed.

In the flowchart shown in FIG. 12, the case where the eighth input image signal is a signal for switching ON a subpixel was explained. In the case where the fifth input image signal, the sixth input image signal and the seventh input image signal are signals that do not switch ON any subpixels, and the eighth input image signal is also a signal that does not switch ON a subpixel, a signal that does not switch ON any subpixel is image processed into a signal that drives each of the corresponding subpixels.

S23 and S24 in FIG. 12 are explained using a red pixel as an example using FIG. 11. When Ro6 corresponding to RD6 is a signal for switching ON RD6, Ro6 is image processed to a signal for driving RD6. Here, since Re8 is a signal for switching ON R8, image processing is performed on the signal for driving the sixth pixel based on Re8 and Ro6. Here, the signal which is image processed is Rp6. For example, Ro6 and Re8 have numeric data representing the luminosity of a pixel, and half of each numerical value of the luminosity may be added and image processing may be performed so as to be input to RD6. Furthermore, a green subpixel and a blue subpixel may be image processed in the same way as a red subpixel.

Furthermore, when Ro6 corresponding to RD6 is a signal for switching ON RD6 and Ro5 corresponding to RD5 is a signal for switching ON RD5, half of the numerical data representing the luminosity of Ro6 and half of the numeric data representing the luminosity of Re 8 may be added and image processing may be performed so as to drive RD6. At this time, half of the numerical data representing the luminosity of Ro5 and half of the numerical data representing the luminosity of Re8 are added and image processing may be performed so as to drive RD5.

Figure 13:
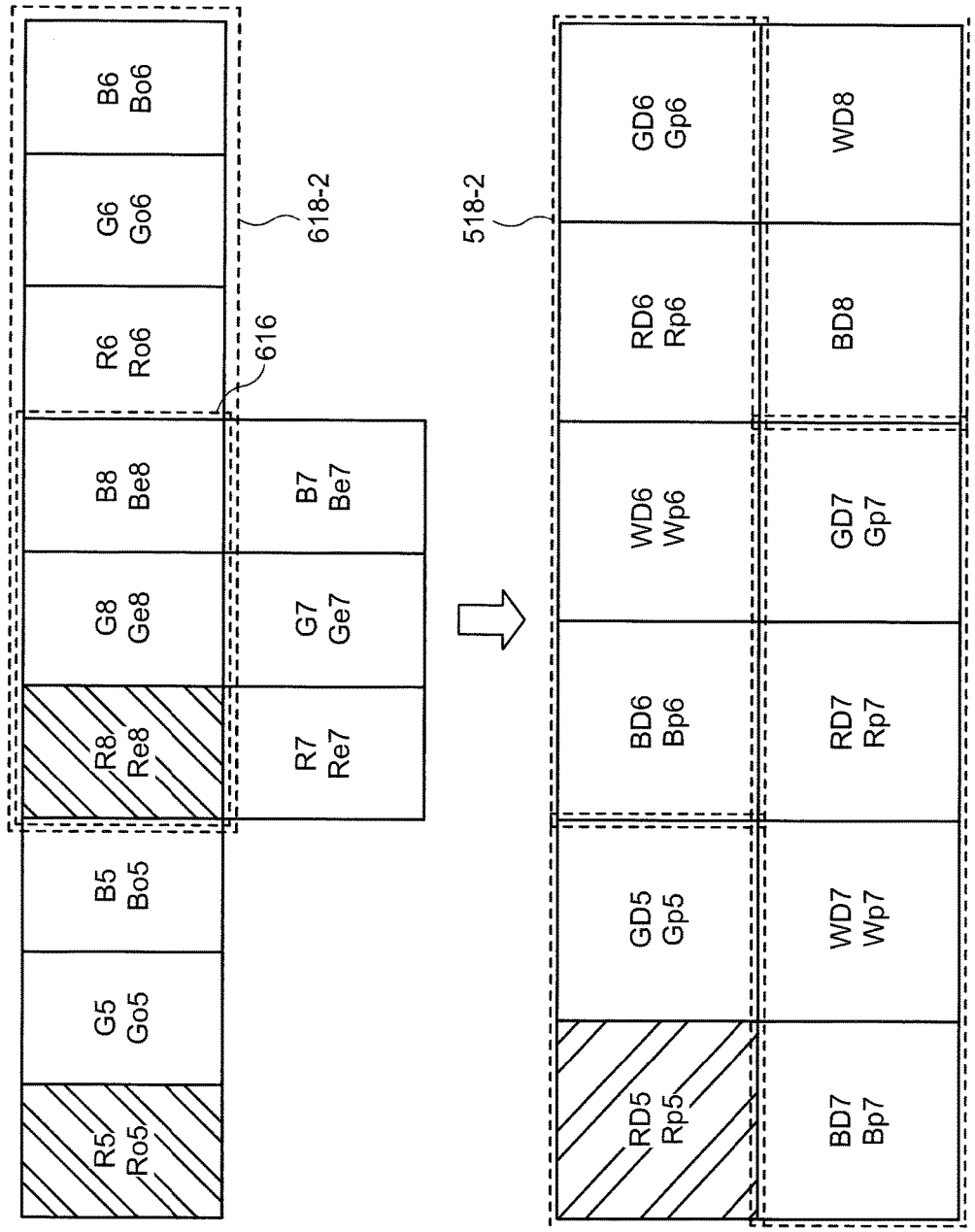
FIG. 13 is a schematic diagram showing a pixel corresponding to an input image and a pixel corresponding to an output image related to one embodiment of the present invention.

In FIGS. 13, S25 and S26 in FIG. 12 are explained using a red pixel as an example. Furthermore, the pixels to be switched ON are different between FIG. 13 and FIG. 12. An explanation of the same structure as that of FIG. 12 is omitted here. When Re6 corresponding to RD6 is a signal which does not switch ON RD6 and Ro5 corresponding to RD5 is a signal which does not switch ON RD5, Ro5 is image processed to a signal for driving RD5. Here, since Re8 is a signal for switching ON R8, and image processing is performed on a signal for driving RD5 based on Re8 and Ro5. Here, the signal which is image processed is Rp5. For example, Ro5 and Ro8 have numerical data representing the luminosity of a pixel, and image processing may be performed so as to drive RD5 by adding half of each numerical value of the luminosity. Furthermore, a green subpixel and a blue subpixel may be subjected to image processing in the same way as a red subpixel.

Figure 14:
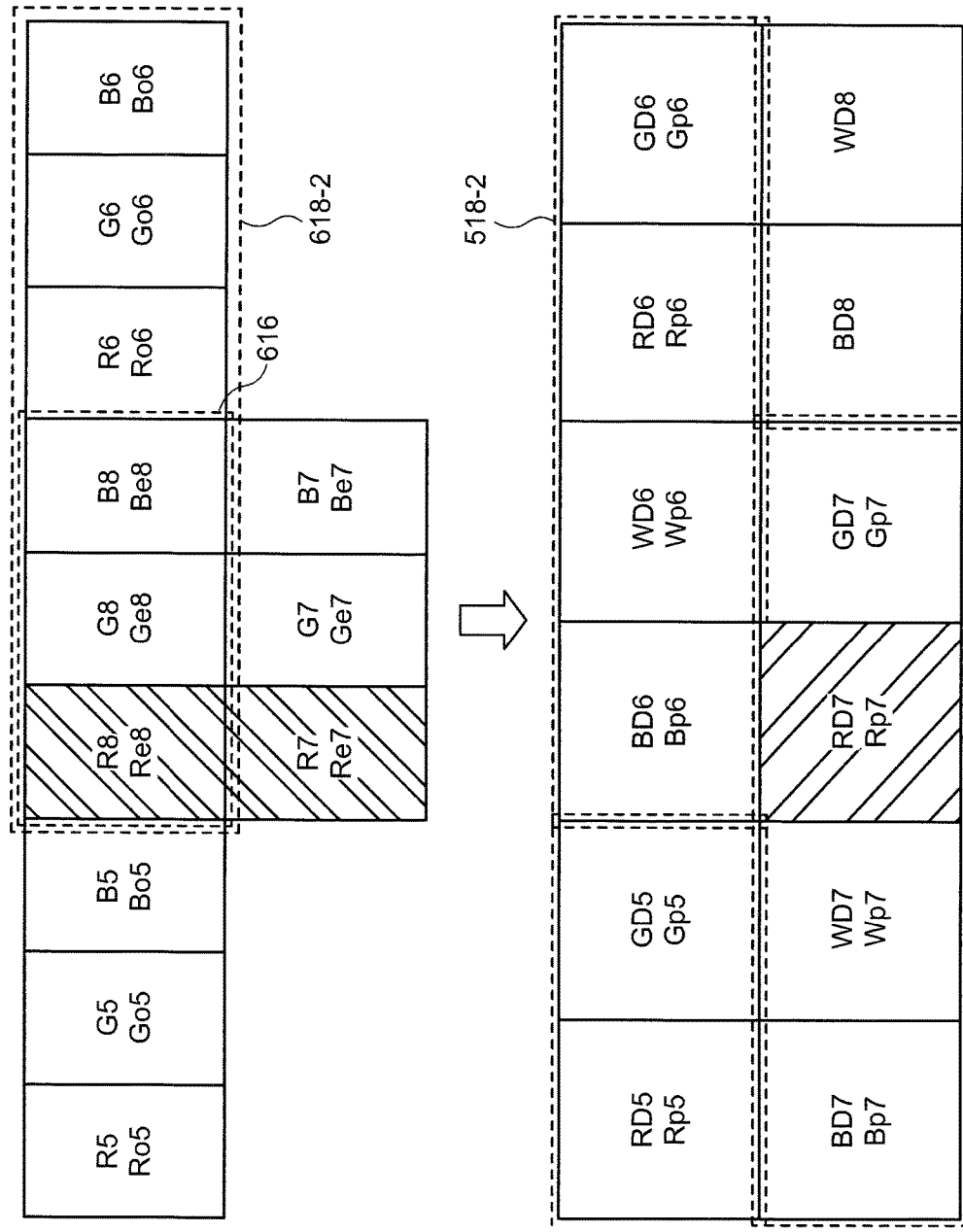
FIG. 14 is a schematic diagram showing a pixel corresponding to an input image and a pixel corresponding to an output image related to one embodiment of the present invention.
Figure 15:
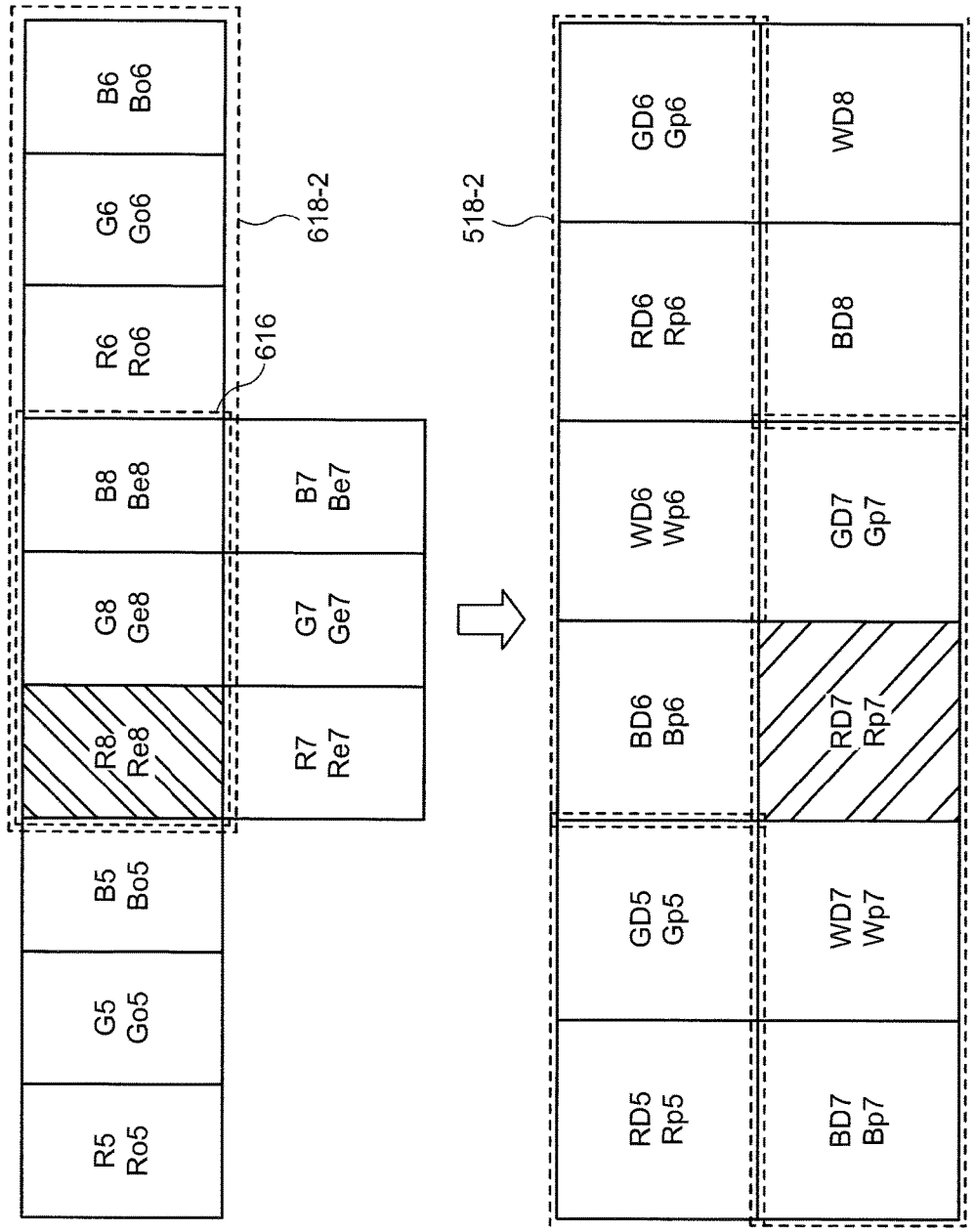
FIG. 15 is a schematic diagram showing a pixel displayed with an input image and an output image related to one embodiment of the present invention.

In FIG. 14 and FIG. 15, S27 in FIG. 12 is explained using a red pixel as an example. Furthermore, the pixels to be switched ON are different between FIG. 14, FIG. 15 and FIG. 11. An explanation of the same structure as that of FIG. 12 is omitted here. FIG. 14 shows an example in which R7 is turned on, and FIG. 15 shows an example in which R7 is not switched ON. When Ro6 corresponding to RD6 is a signal which does not switch ON RD6 and Ro5 corresponding to RD5 is a signal which does not switch ON RD5, Re7 is image processed to a signal for driving RD7. Here, since Re8 is a signal for switching ON R8, image processing is performed on a signal for driving RD7 based on Re8 and Re7. Here, the signal which is image processed is Rp7. For example, Re7 and Re8 have numerical data representing the luminosity of a pixel, half of each numerical value of the luminosity is added, and image processing may be performed on the signal for driving RD7. Furthermore, a green subpixel and a blue subpixel may be subjected to image processing in the same way as a red subpixel.

By repeating the processes explained in FIG. 4 to FIG. 15 for odd numbered rows and even numbered rows, it is possible to perform image processing of one screen to be displayed on the display panel.

Figure 16:
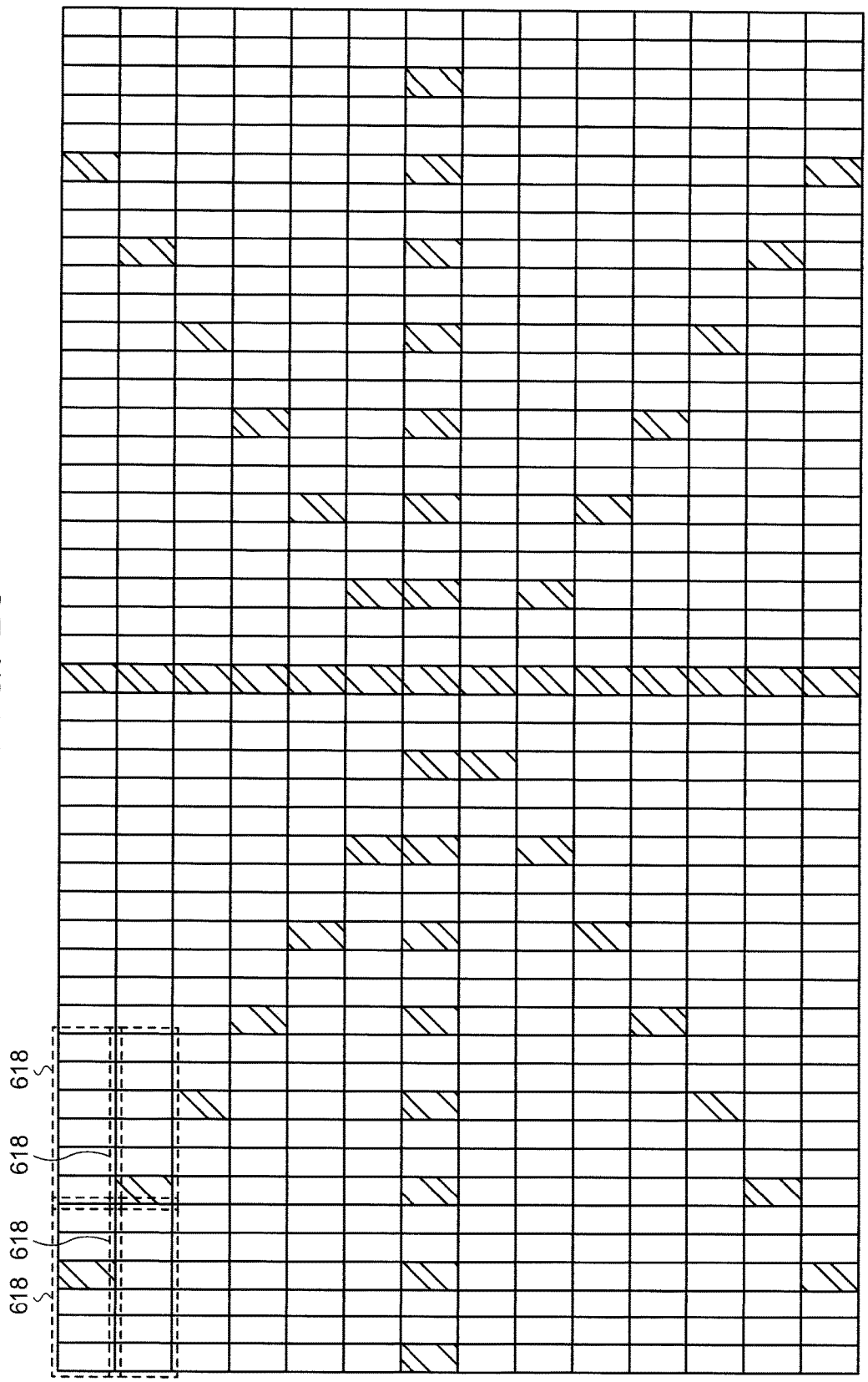
FIG. 16 is a schematic diagram showing an example of an input image related to one embodiment of the present invention.
Figure 17:
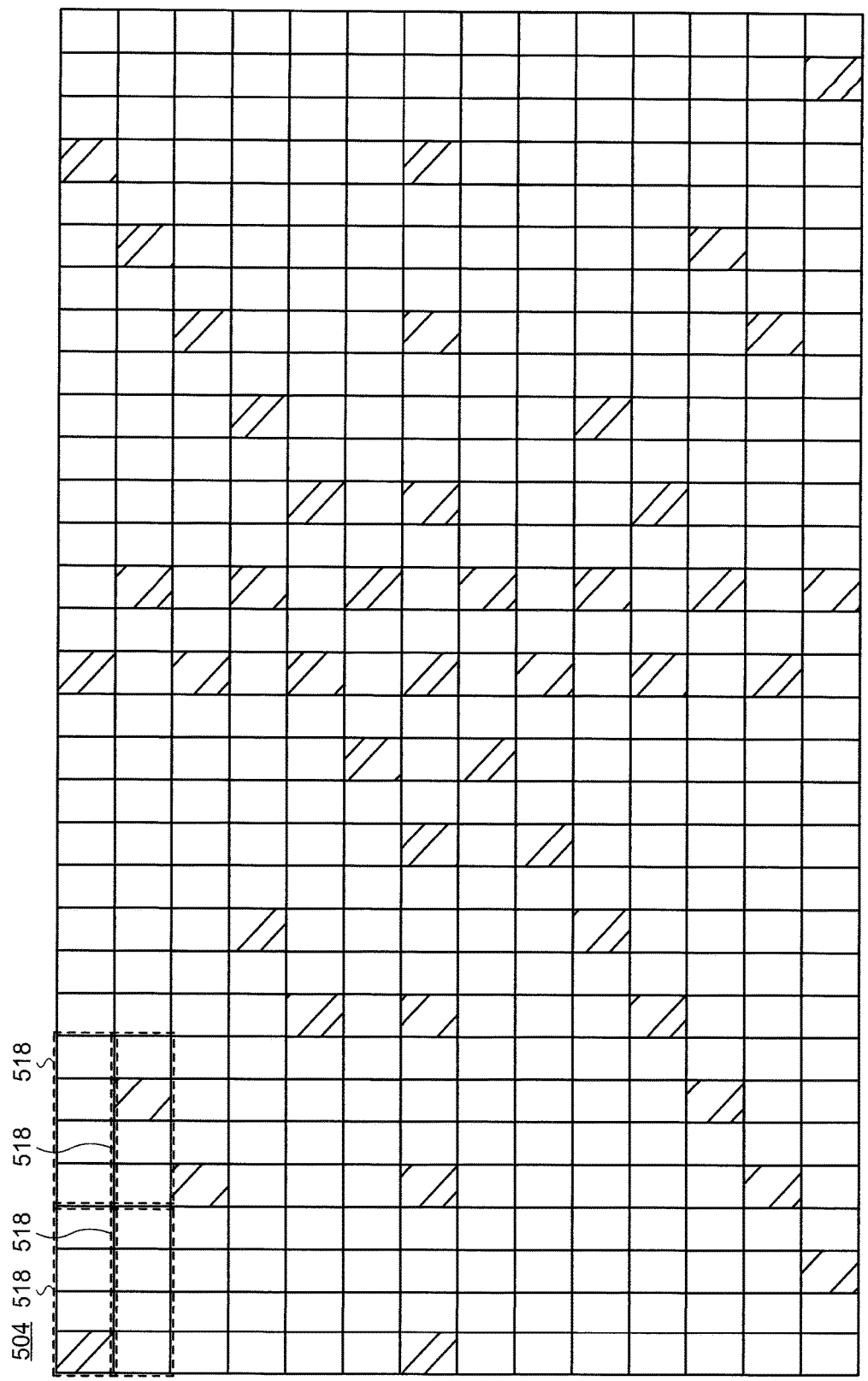
FIG. 17 is a schematic diagram showing an example of an output image in the case when an image processing method related to one embodiment of the present invention is not performed.
Figure 18:
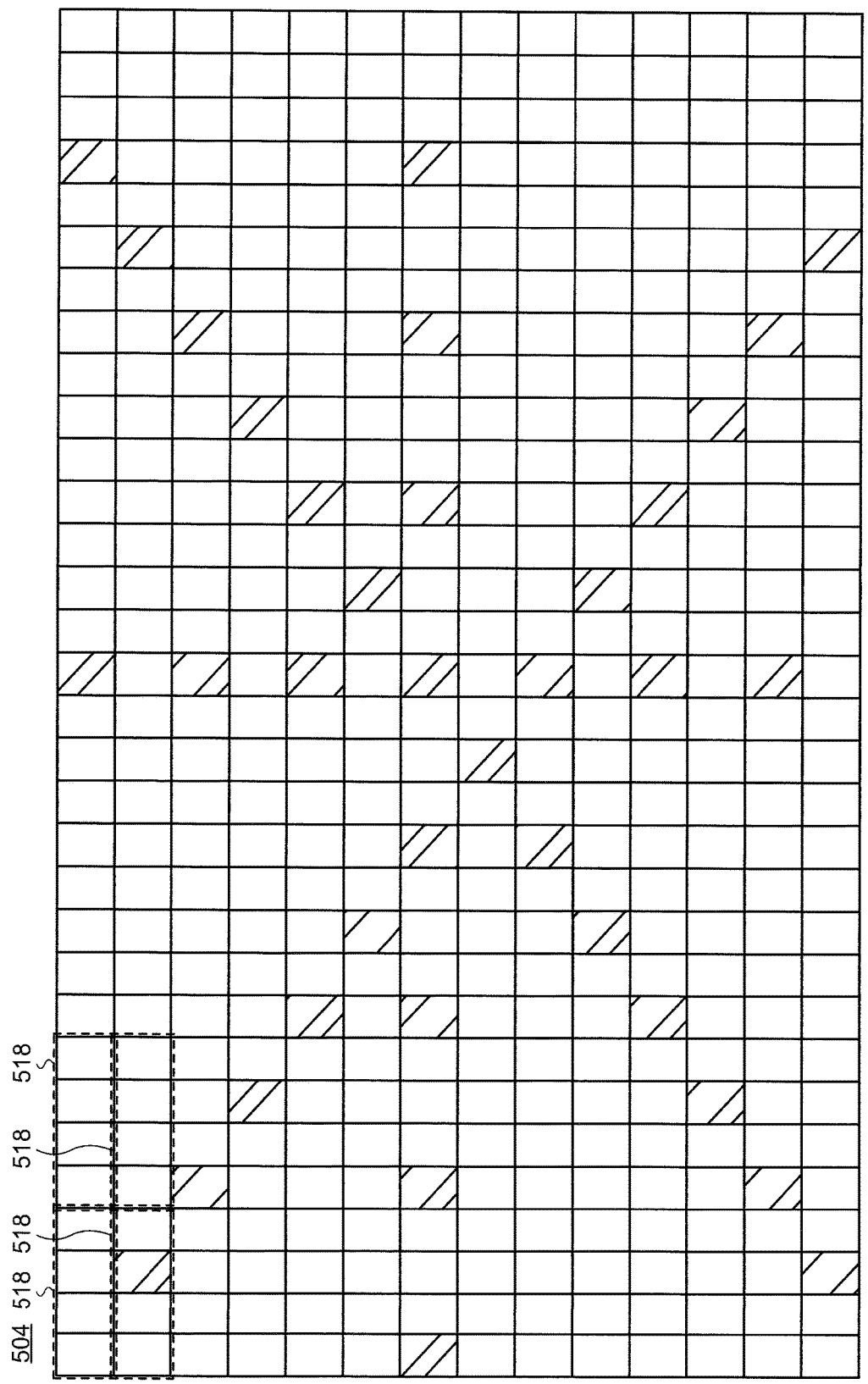
FIG. 18 is a schematic diagram showing an example of an output image in the case when an image processing method related to one embodiment of the present invention is performed.

FIG. 16 is a schematic diagram showing an example of an input image according to one embodiment of the present invention. FIG. 17 is a schematic diagram showing an example of a case where an output image is displayed in the display region 504 without performing the image processing method according to one embodiment of the present invention as the input image shown in FIG. 16. FIG. 18 is a schematic diagram showing an example in the case where the input image shown in FIG. 16 is image processed using the image processing method according to one embodiment of the present invention and the output image is displayed in the display region 504.

As is shown in FIG. 17, in the case when the image processing method according to one embodiment of the present invention is not performed, one vertical line, horizontal line, and diagonal line are double lines. Therefore, in the case when the image processing method according to one embodiment of the present invention is not performed, it is understood that the visibility of the display device is lost. On the other hand, as is shown in FIG. 18, by using the image processing method according to one embodiment of the present invention, it can be recognized that one vertical line, horizontal line and diagonal line are formed as one vertical line, horizontal line and diagonal line. Therefore, by using the image processing method according to one embodiment of the present invention, visibility of the display device is not lost.

By using the image processing method according to one embodiment of the present invention, even if image processing is performed so that an input image signal of two pixels of three primary colors are displayed on the display device for one pixel of four colors, a vertical line, horizontal line and diagonal line are not misaligned. Similarly, one vertical line, horizontal line, and diagonal line do not become double lines. Therefore, by using the image processing method according to one embodiment of the present invention, it is possible to provide a display device with high visibility.

Second Embodiment

In the present embodiment, another structure of a display device according to one embodiment of the present invention is explained. The same explanation as in the first embodiment is omitted.

Figure 19:
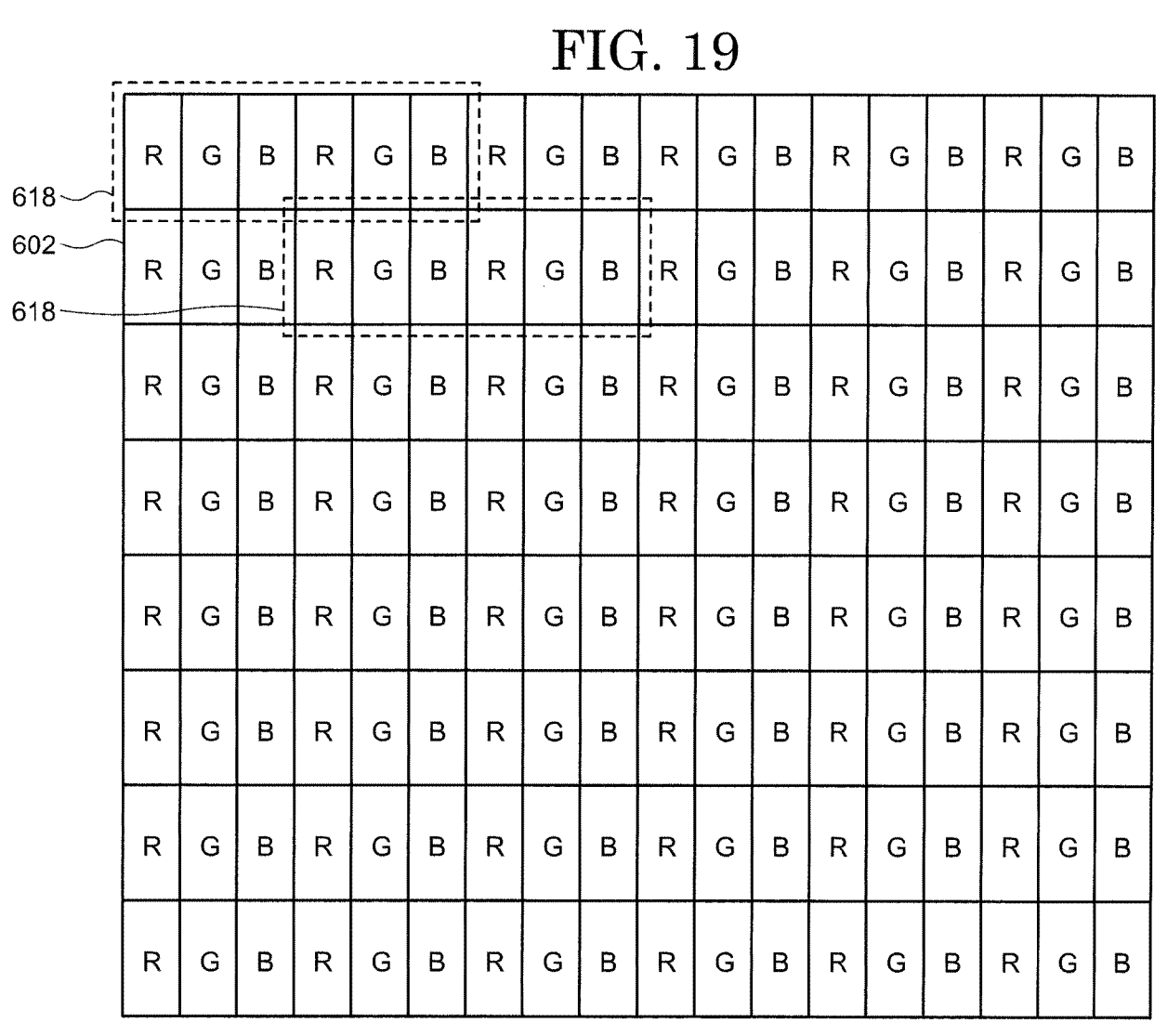

FIG. 19 is a schematic diagram showing another example of an input image according to one embodiment of the present invention. FIG. 19 is different from FIG. 4 in that processing is performed by shifting by one pixel when performing image processing of even numbered rows. The rest of the structure is the same as that of FIG. 4, and an explanation here is omitted.

FIG. 20 is a schematic diagram showing another example of an output image according to one embodiment of the present invention. FIG. 20 shows an example of an output image corresponding to the process of shifting the image processing of even numbered rows shown in FIG. 19 by one pixel. It can be seen that an output image of an even numbered row is shifted by a subpixel corresponding to blue and a subpixel corresponding to white by shifting an input image in an even numbered row by one subpixel. FIG. 20 is different from FIG. 5 in that the subpixels corresponding to blue and the subpixels corresponding to white are displayed shifted from each other. The rest of the structure is the same as that of FIG. 5 and an explanation here is omitted.

As is explained in FIG. 19 and FIG. 20, by shifting the image processing of even numbered rows by one pixel, it is possible to make the arrangement of pixels of one pixel of an odd numbered row and one pixel of an even numbered row in an output image the same. That is, in the image processing of even numbered rows, it is possible to perform image processing the same as odd numbered rows by shifting the input image signal by one pixel.

Figure 21:
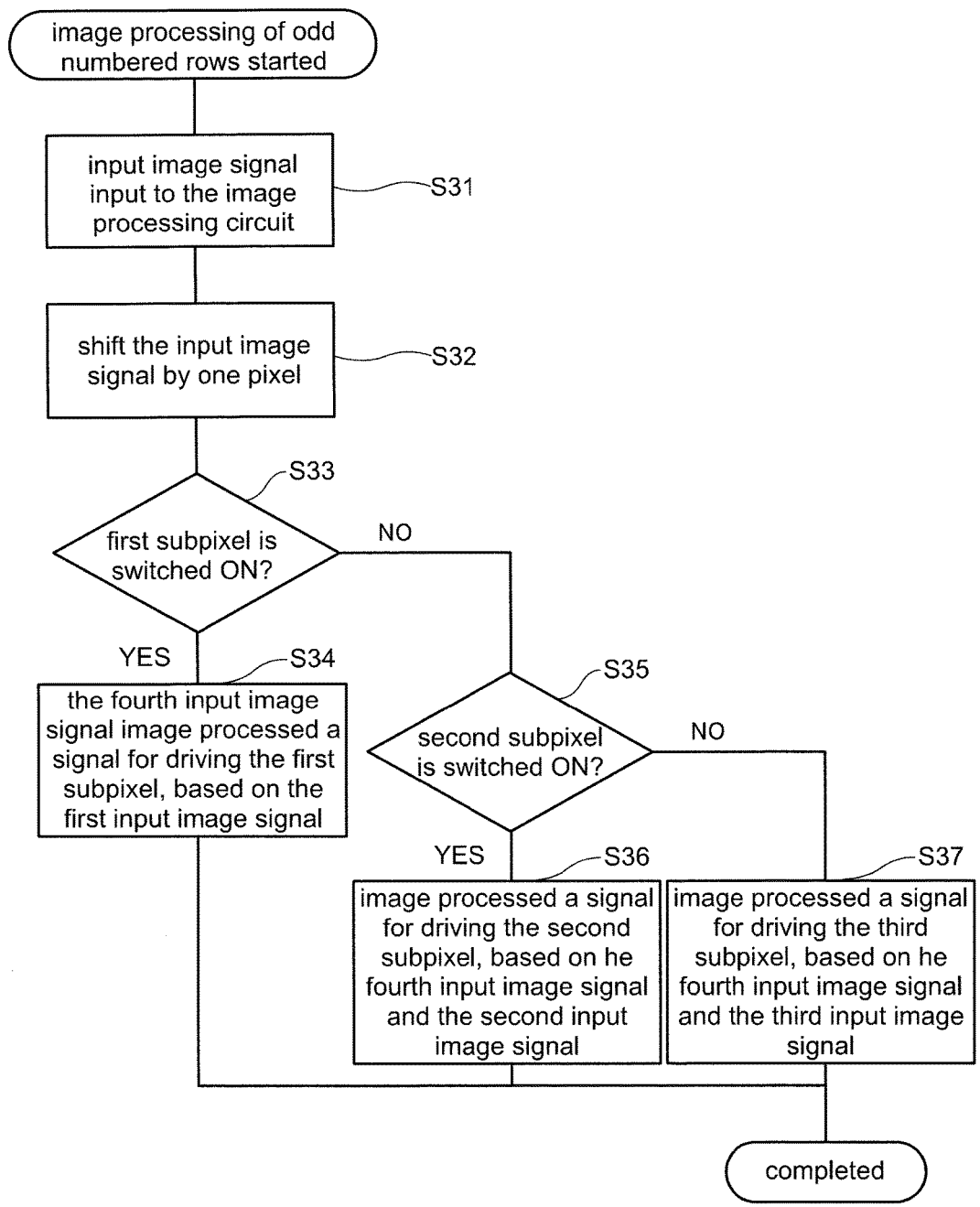
FIG. 21 is schematic diagram showing a flowchart for explaining another image processing method related to one embodiment of the present invention.

FIG. 21 is a schematic diagram showing a flowchart explaining another image processing method according to one embodiment of the present invention. Specifically, FIG. 21 shows a flowchart in the case where processing is performed by shifting by one pixel when performing image processing of even numbered rows in a display device according to one embodiment of the present invention.

First, image processing of even numbered rows displayed on the display panel is started. For example, image processing of an image displayed on the second row of the display panel is started. Next, the input image signal 110 is input to the image processing circuit 100 (step 31 (S31)). The input image signal 110 is stored in the memory circuit 20, and when image processing is started, the input image signal may be read from the memory circuit 20 and the input image signal may be processed. If the input image signal 110 is not stored in the memory circuit 20 and image processing is started, the image data included in the input image signal 110 may be processed one by one. In addition, in the case where processing of the even numbered rows is performed after processing of odd numbered rows, and the input image signal 110 is already input and the input image signal 110 is stored in the memory circuit 20, then S32 does not need to be performed.

Next, the image processing circuit shifts the input image signal 110 by one pixel (step 32 (S32)).

Since step 33 (S33) to step 37 (S37) are the same as the processing method from step 13 (S13) to step 17 (S17) in FIG. 6, an explanation here is omitted.

When image processing of one subpixel is completed, steps S33 to S37 are performed on an adjacent subpixel in the same row, and when image processing is performed for all subpixels in the same odd numbered row, image processing is completed. In the flowchart shown in FIG. 21, the case where the fourth input image signal is a signal for switching ON a subpixel is explained. In the case where the first input image signal, the second input image signal and the third input image signal are signals that do not switch ON any subpixels, and the fourth input image signal is also a signal that does not switch ON a subpixel, a signal that does not switch ON any subpixel is subjected to image processing into a signal that drives each corresponding subpixel.

In the image processing of even numbered rows, by shifting the input image signal by one pixel, it is possible to perform image processing similar to that of odd numbered rows.

By repeating the image processing as explained above in odd numbered rows and even numbered rows, it is possible to perform image processing of one screen to be displayed on the display panel.

FIG. 18 shows an example in the case of performing image processing similar to that of odd numbered rows by shifting the input image signal by one pixel in the image processing of even numbered rows and displaying an output image in the display region 504. By using the image processing method according to one embodiment of the present invention, it is possible to recognize one vertical line, horizontal line, and a diagonal line as one vertical line, horizontal line and a diagonal line and visibility is not lost.

By using the image processing method according to one embodiment of the present invention, it is possible to provide a display device with high visibility. Furthermore, in the image processing of even numbered rows, the image processing circuit according to one embodiment of the present invention can perform the same image processing as in odd numbered rows by shifting an input image signal by one pixel. Therefore, compared with the case where image processing of odd numbered rows and image processing of even numbered rows are different, it is possible to share circuit blocks in the image processing circuit. That is, the circuit size of the image processing circuit can be reduced. In addition, since the circuit size of the image processing circuit is reduced, power consumption of the image processing circuit can be reduced.

Third Embodiment

In the present embodiment, another structure of a display device according to one embodiment of the present invention is explained. An explanation similar to that of the first embodiment or the second embodiment is omitted.

Figure 22:
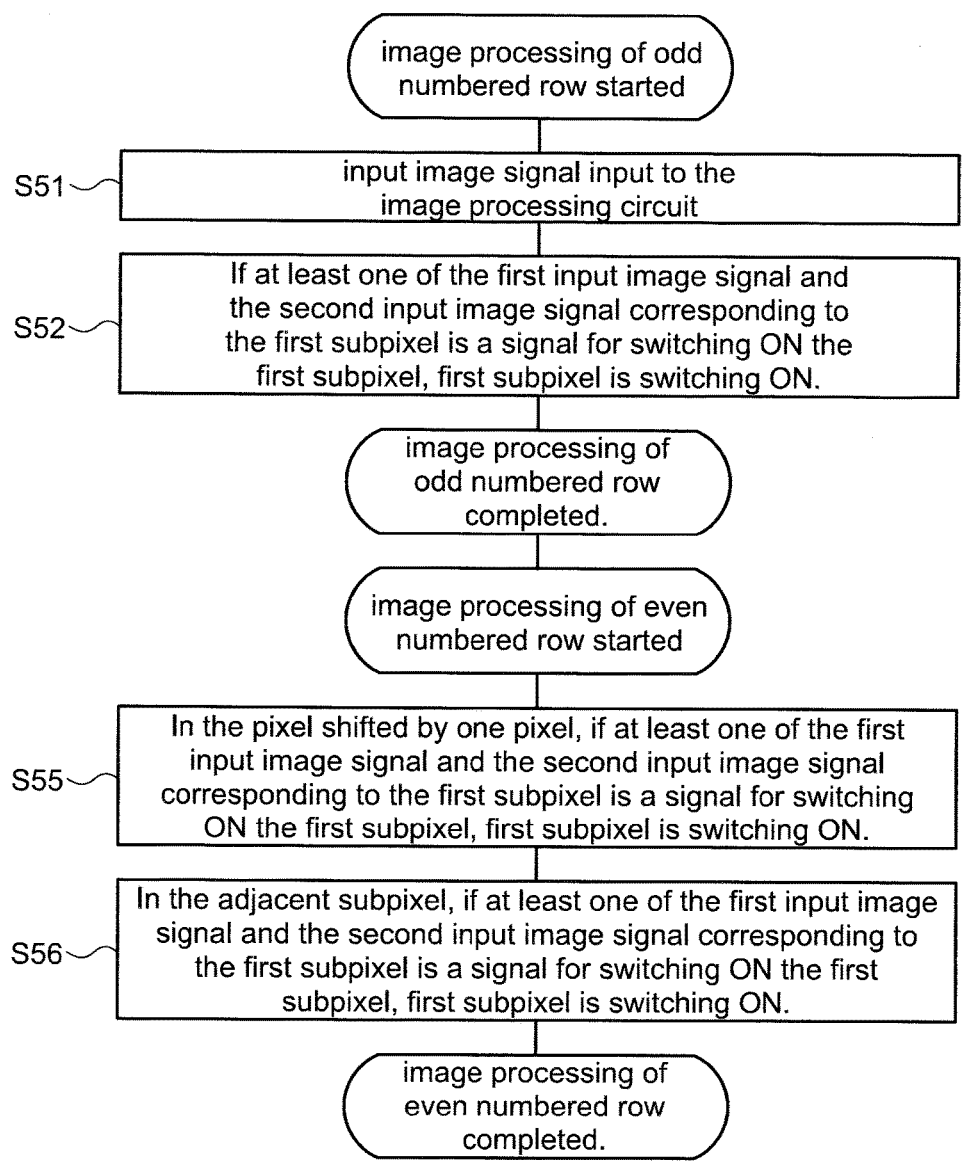
FIG. 22 is schematic diagram showing a flowchart for explaining another image processing method related to one embodiment of the present invention.

FIG. 22 is a schematic diagram showing a flowchart for explaining another image processing method according to one embodiment of the present invention.

First, image processing of odd numbered rows displayed on the display panel is started. For example, image processing of an image displayed on the first row of the display panel is started. Next, the input image signal 110 is input to the image processing circuit 100 (step 51 (S51)). The input image signal 110 is stored in the memory circuit 20, and when image processing is started, the input image signal may be read from the memory circuit 20 and an input image signal may be processed. If image processing is started but the input image signal 110 is not stored in the memory circuit 20, the image data included in the input image signal 110 may be processed one by one.

Next, it is judged whether at least one of the first input image signal and the second input image signal corresponding to the first subpixel is a signal for switching ON the first subpixel. When at least one of the first input image signal and the second input image signal is a signal for switching ON the first subpixel, at least one of the first input image signal and the second input image signal is image processed into a signal for switching ON the first subpixel (step 52 (S52)). An input image signal corresponding to two pixels of three primary colors in one embodiment of the present invention corresponds to a first input image signal and a second input image signal.

Next, image processing in S52 is performed on the adjacent subpixel in the first row, and when the image processing is performed on all the subpixels in the first row, image processing of the first row is completed. Furthermore, when both the first input image signal and the second input image signal corresponding to the first subpixel are signals that do not switched ON the first subpixel, a signal that does not switched ON the first subpixel is image processed into a signal for driving the first pixel.

Next, image processing of even numbered rows displayed on the display panel is started. For example, image processing of an image displayed on the second row of the display panel is started. Next, the image processing circuit shifts the input image signal 110 by one pixel. When the input image signal 110 is shifted by one pixel, it is judged whether at least one of the first input image signal and the second input image signal corresponding to the first subpixel is a signal for switching ON the first subpixel. When at least one of the first input image signal and the second input image signal is a signal for switching ON the first subpixel, at least one of the first pixel input image signal and the second input image signal is image processed into a signal for driving the first subpixel (step 55 (S55)).

Next, in an adjacent subpixel of the second row, it is determined whether at least one of the first input image signal and the second input image signal corresponding to the first subpixel is a signal for switching ON the first subpixel. When at least one of the first input image signal and the second input image signal is a signal for switching ON the first subpixel, at least one of the first input image signal and the second input image signal are image processed into a signal for driving the first subpixel (step 56 (S56)).

Next, in an adjacent subpixel in the second row, image processing in S56 is performed, and when the image processing is performed on all the subpixels in the second row, image processing in the second row is completed. Furthermore, when both the first input image signal and the second input image signal corresponding to the first subpixel are signals that do not switch ON the first subpixel, a signal that does not switch ON the first subpixel is input to the first subpixel. When image processing is performed on all the sub pixels of the second row, image processing of the second row is completed.

By repeating the image processing from step S50 to S57 explained in FIG. 22 for odd numbered rows and even numbered rows, image processing of one screen to be displayed on the display panel can be performed.

Figure 23:
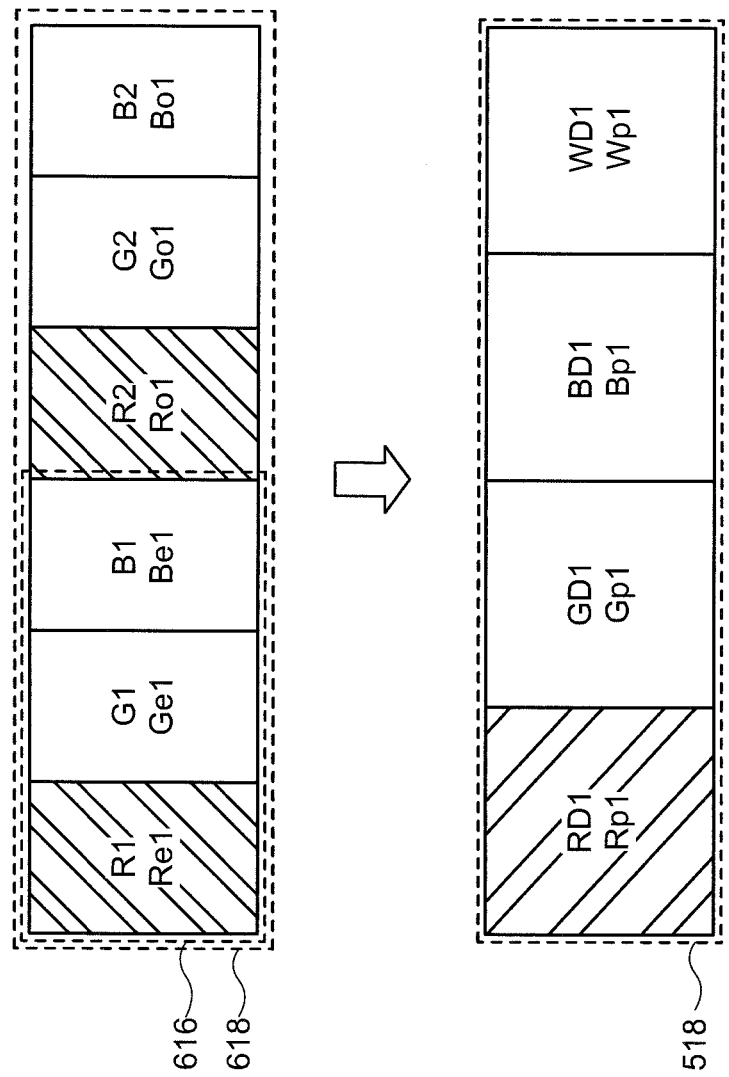
FIG. 23 is a schematic diagram showing a pixel corresponding to an input image and a pixel corresponding to an output image related to one embodiment of the present invention.

FIG. 23 is a schematic diagram showing pixels corresponding to an input image and pixels corresponding to an output image according to one embodiment of the present invention. In FIG. 23, two pixels 618 corresponding to an input image signal are converted into one pixel 518 corresponding to the output image. In particular, an example is shown in which two subpixels corresponding to a red input image signal are converted into one subpixel corresponding to a red output image. In addition, in FIG. 23, in the subpixel corresponding to the input image, subpixels to be switched ON are indicated by hatching with right diagonal lines and in subpixels corresponding to the output image, subpixels to be switched ON are indicated by hatching with left diagonal lines.

A red subpixel of the first pixel is RD1. The first input pixel corresponding to RD1 is R1. The first input image signal of R1 is Re1. A green subpixel of the first pixel is GD1. The first input pixel corresponding to GD1 is G1. The first input image signal of G1 is Ge1. A blue subpixel of the first pixel is BD1. The first input pixel corresponding to BD1 is B1. The first input image signal of B1 is Be1.

In the second input pixel, the red pixel is R2. The second input image signal corresponding to R2 is Ro1. In the second input pixel, the green pixel is G2. The second input image signal corresponding to G2 is Go1. In the second input pixel, the blue pixel is B2. The second input image signal corresponding to B2 is Bo1.

S52 in FIG. 22, S55 after one pixel is shifted and S56 are explained using a red subpixel as an example using FIG. 23. When Re1 corresponding to RD1 is a signal that does not switch ON RD1, Re1 is image processed to a signal for driving RD1. Since Ro1 is a signal for switching ON R2, Ro1 is also image processed to a signal for driving RD1 based on Ro1 and Re1. Here, a signal to be image processed is Rp1. For example, Re1 and Ro1 have numerical data representing the luminosity of pixels and half of each numerical value of the luminosity may be added and image processed to a signal for driving RD1. Furthermore, a green subpixel and a blue subpixel may be image processed in the same way as a red subpixel.

Figure 24:
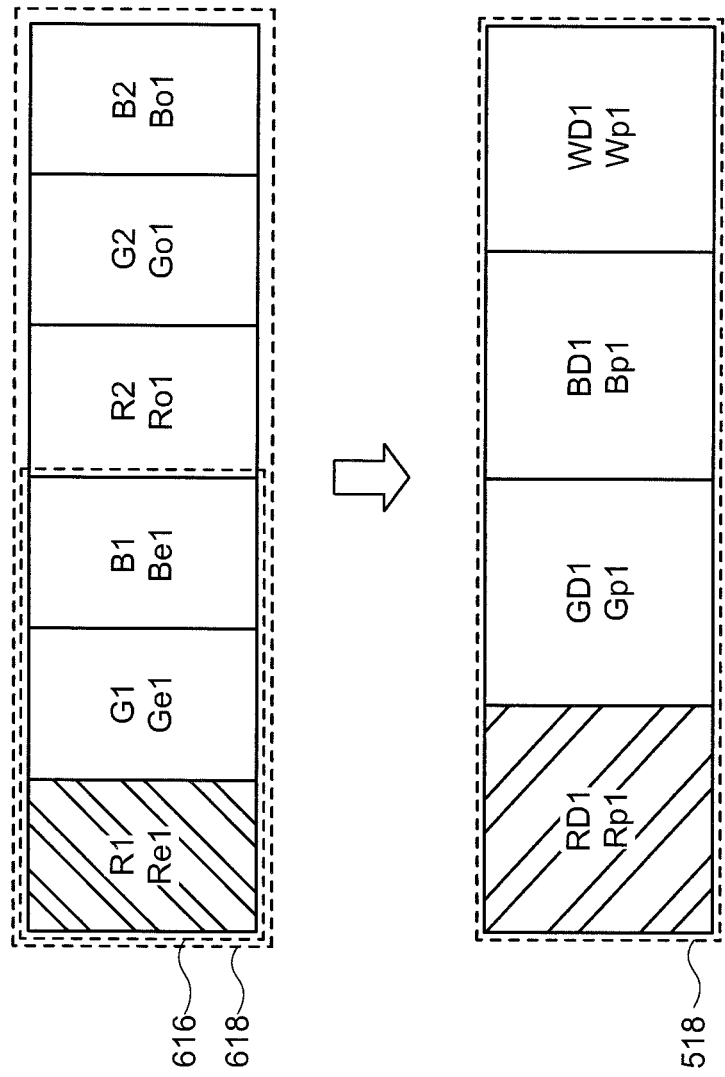
FIG. 24 is a schematic diagram showing a pixel corresponding to an input image and a pixel corresponding to an output image related to one embodiment of the present invention.

S52 in FIG. 22, S55 after one pixel is shifted and S56 are explained using a red subpixel as an example using FIG. 24. When Re1 corresponding to RD1 is a signal for switching ON RD1, Re1 is image processed to a signal for driving RD1. Ro1 is not a signal for switching ON R2. Here, a signal to be image processed is Rp1. For example, Re1 has numerical data representing the luminosity of pixels and half of the numerical value of the luminosity may be image processed to a signal for driving RD1. Furthermore, a green subpixel and a blue subpixel may be image processed in the same way as a red subpixel.

Figure 25:
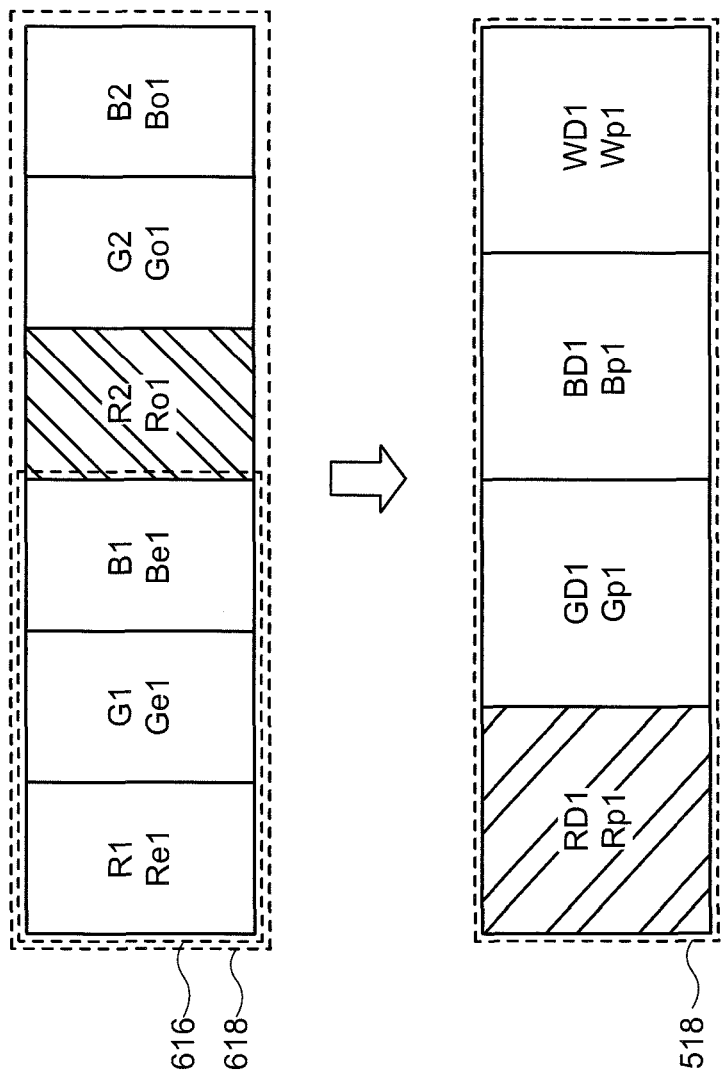
FIG. 25 is a schematic diagram showing a pixel corresponding to an input image and a pixel corresponding to an output image related to one embodiment of the present invention.

S52 in FIG. 22, S55 after one pixel is shifted and S56 are explained using a red subpixel as an example using FIG. 25. When Re1 corresponding to RD1 is a signal which does not switch ON RD1, Re1 is not image processed to a signal for driving RD1. When Ro1 is a signal for switching ON R2, Ro1 is image processed to a signal for driving RD1. Here, a signal to be image processed is Rp1. For example, Ro1 has numerical data representing the luminosity of pixels and half of the numerical value of the luminosity may be image processed to a signal for driving RD1. Furthermore, a green subpixel and a blue subpixel may be image processed in the same way as a red subpixel.

Figure 26:
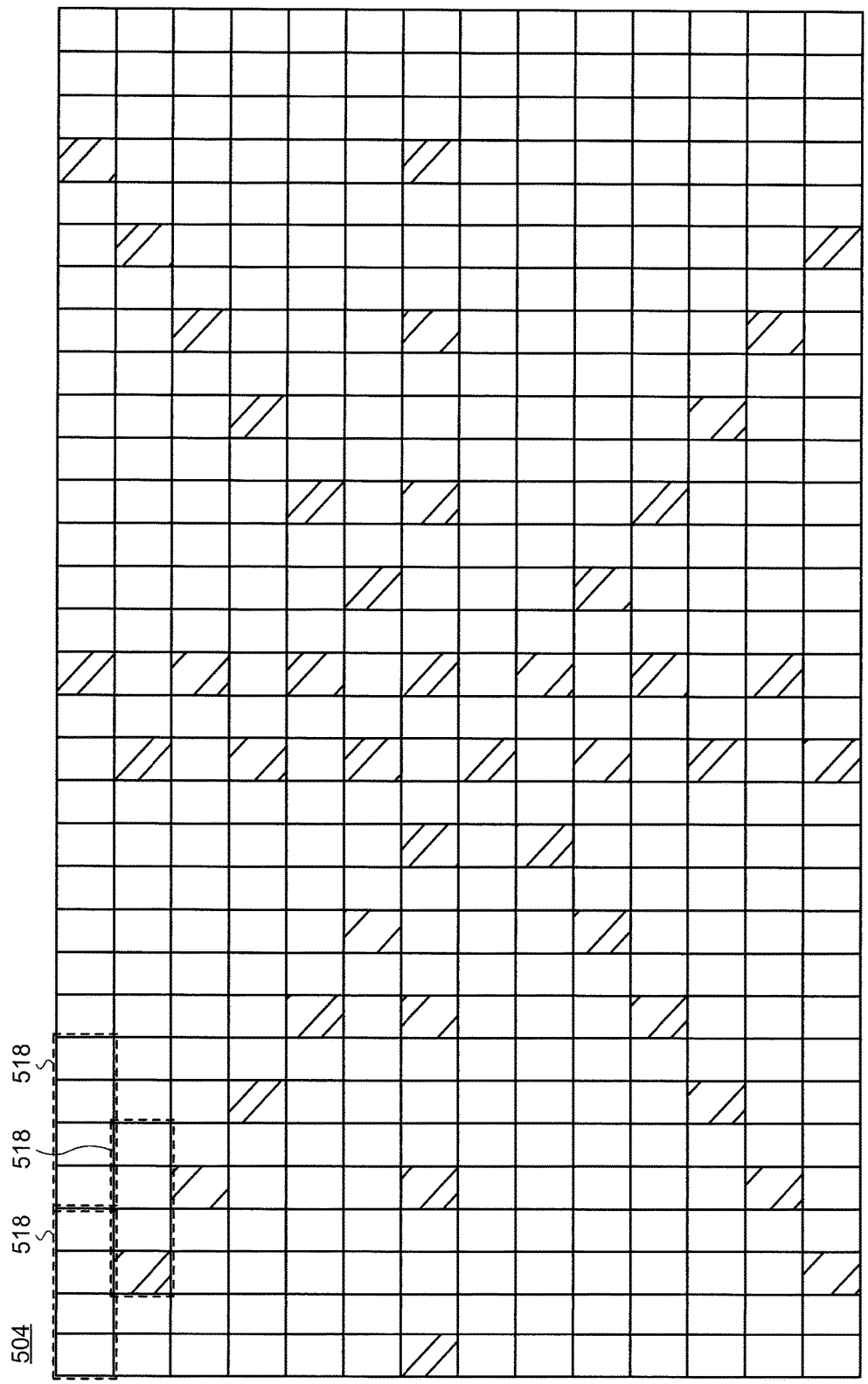
FIG. 26 is a schematic diagram showing an example of an output image in the case when another image processing method related to one embodiment of the present invention is performed.

FIG. 26 is a schematic diagram showing an example in the case where the input image shown in FIG. 16 is subjected to image processing using the image processing method according to one embodiment of the present invention and the output image is displayed in the display region 504.

As is shown in FIG. 26, by using the image processing method according to one embodiment of the present invention, one diagonal line does not become a double line.

By using the image processing method according to one embodiment of the present invention, even if image processing is performed so that the input image signals of two pixels of the three primary colors can be displayed by one pixel of four colors, a diagonal line does not become misaligned. In addition, similarly, diagonal lines do not become double lines. In addition, by using the image processing method according to one embodiment of the present invention, a display device with high visibility can be provided. Furthermore, the image processing circuit according to one embodiment of the present invention can perform the same image processing in odd numbered rows by shifting the input image signal by one pixel in the image processing of even numbered rows. Therefore, it is possible to share circuit blocks in the image processing circuit compared with the case where the image processing of the odd numbered rows and the image processing of the even numbered rows are different. Therefore, the circuit size of the image processing circuit can be reduced.

Fourth Embodiment

In the present embodiment, an arrangement of pixels included in a display device according to one embodiment of the present invention is explained. An explanation similar to those of the first to third embodiments is omitted.

Figure 27:
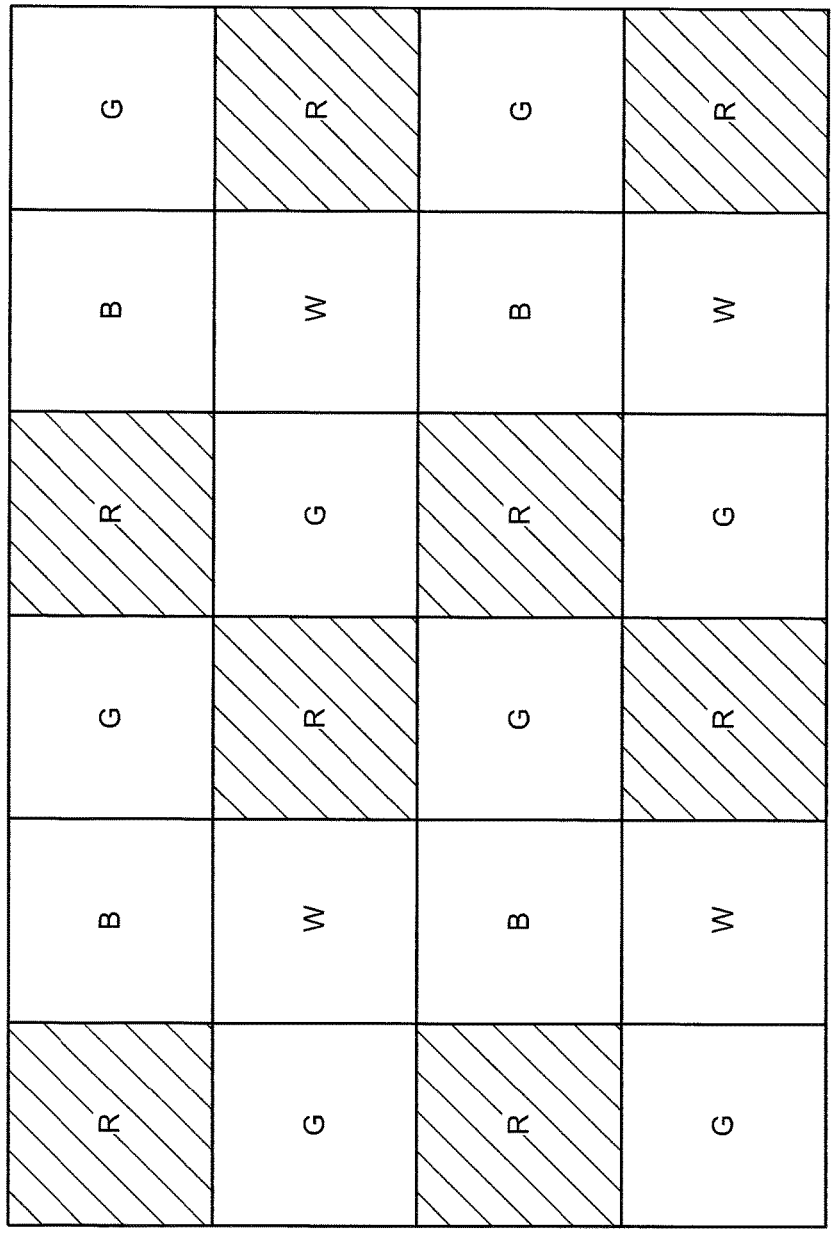
FIG. 27 is a schematic diagram showing another example of a pixel corresponding to an output image related to one embodiment of the present invention.

FIG. 27 is a schematic diagram showing another example of pixels corresponding to an output image according to one embodiment of the present invention. For example, subpixels corresponding to red (R) are arranged in a staggered pattern as shown by hatching using right diagonal lines. Subpixels corresponding to blue (B) and subpixels corresponding to green (G) are arranged between subpixels corresponding to red (R) in the same row. Alternatively, subpixels corresponding to green (G) and subpixels corresponding to white (W) are arranged between subpixels corresponding to red (R) in the same row.

Figure 28:
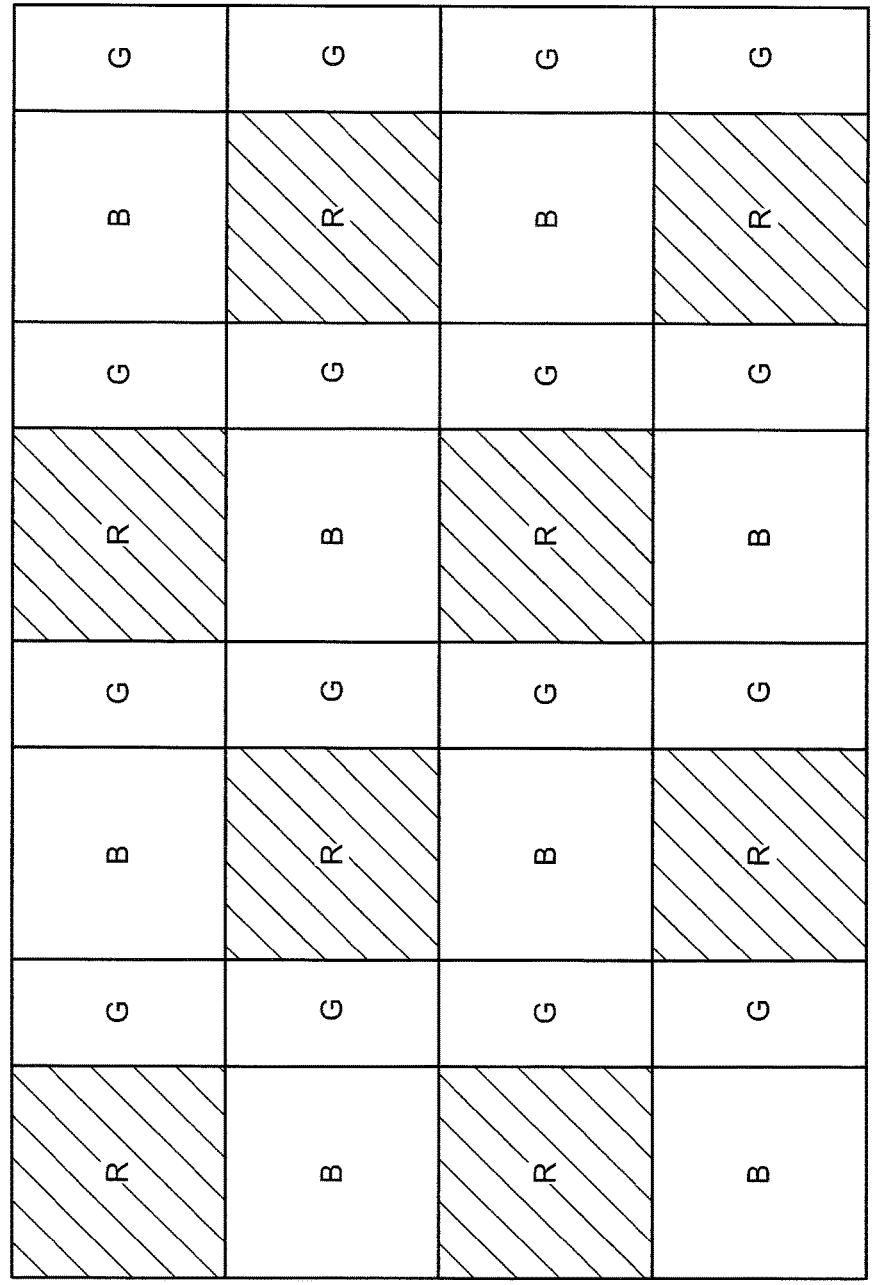
FIG. 28 is a schematic diagram showing another example of a pixel corresponding to an output image related to one embodiment of the present invention.

FIG. 28 is a schematic diagram showing another example of pixels corresponding to an output image according to one embodiment of the present invention. For example, subpixels corresponding to red (R) are arranged in a staggered pattern as shown by hatching using right diagonal lines. A first subpixel corresponding to green (G), a subpixel corresponding to blue (B), and a second subpixel corresponding to green (G) are arranged between subpixels corresponding to red (R) in the same row.

Figure 29:
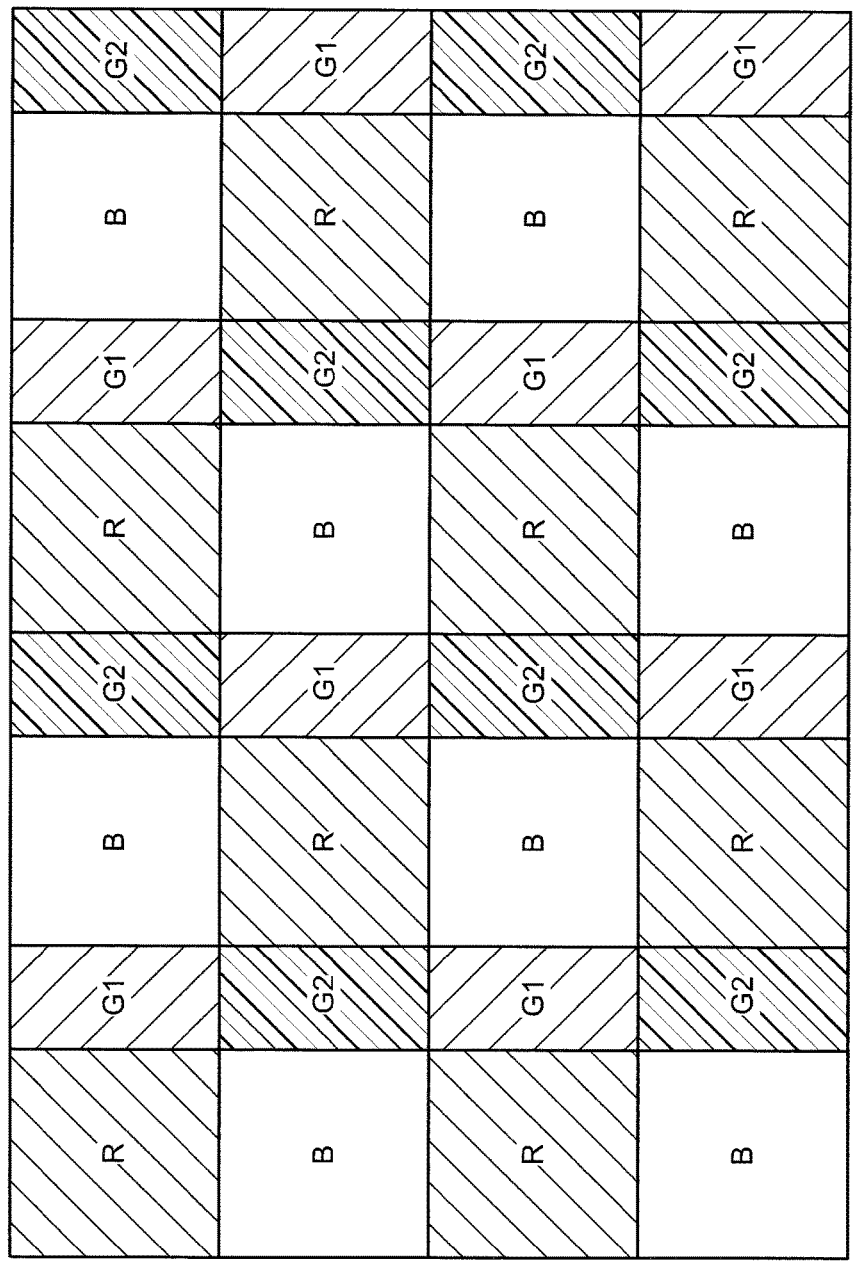
FIG. 29 is a schematic diagram showing another example of a pixel corresponding to an output image related to one embodiment of the present invention.

FIG. 29 is a schematic diagram showing another example of pixels corresponding to an output image according to one embodiment of the present invention. Compared with FIG. 28, FIG. 29 is different in that a first subpixel corresponding to green (G1), a subpixel corresponding to blue (B), and a second subpixel corresponding to green (G2) are arranged between subpixels corresponding to red (R) in the same row. Apart from this, FIG. 29 has the same structure as FIG. 28 so an explanation of the same structure as in FIG. 28 is omitted here. A first subpixel corresponding to green (G1) may also be a subpixel corresponding to a color closer to yellow than green (G). In addition, a second subpixel corresponding to green (G2) may also be a subpixel corresponding to a color closer to cyan than green (G).

Figure 30:
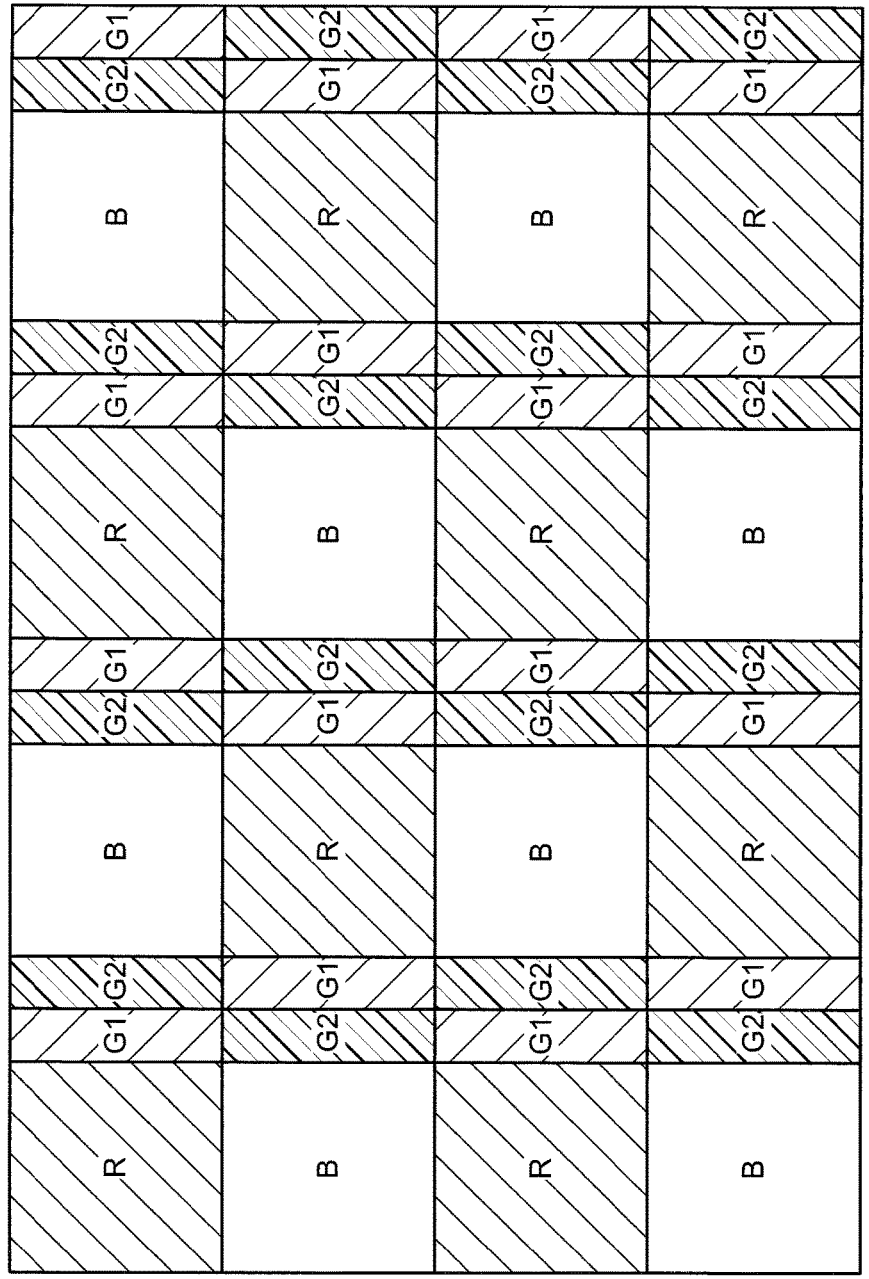
FIG. 30 is a schematic diagram showing another example of a pixel corresponding to an output image related to one embodiment of the present invention.

FIG. 30 is a schematic diagram showing another example of pixels corresponding to an output image according to one embodiment of the present invention. Compared with FIG. 28, FIG. 30 is different in that between subpixels corresponding to red (R) in the same row, a first subpixel corresponding to green (G1), a first subpixel (G2) corresponding to green, a subpixel corresponding to blue (B), a second subpixel corresponding to green (G2) and a second subpixel corresponding to green (G1) are arranged. Apart from this, FIG. 30 has the same structure as FIG. 28 so an explanation of the same structure as in FIG. 28 is omitted here. A first subpixel corresponding to green (G1) may also be a second subpixel corresponding to a color closer to yellow than green (G). In addition, a subpixel corresponding to green (G2) may also be a subpixel corresponding to a color closer to cyan than green (G).

The arrangement of the pixels included in the display device according to one embodiment of the present invention can be applied to the arrangement of pixels in which pixels of the same color are arranged in a staggered pattern as shown in FIG. 27, FIG. 28, FIG. 29, FIG. 30 and FIG. 5. A display device according to one embodiment of the present invention can provide a display device with high visibility and an image processing method for a display device with high visibility by applying an arrangement of pixels arranged in a staggered manner.

In each of the embodiments described above as embodiments of the present invention, a subpixel corresponding to white (W) may be a subpixel corresponding to yellow, a subpixel corresponding to cyan or a subpixel corresponding to magenta. In addition, in each of the embodiments described above as embodiments of the present invention, image processing may not necessarily be performed for all the subpixels. For example, image processing may be applied to two subpixels, a subpixel corresponding to red (R) and a subpixel corresponding to green (G). Such a practice may be appropriately examined as long as it does not deviate from the invention of the present application.

Each of the embodiments described above as embodiments of the present invention can be implemented in combination as appropriate as long as they do not contradict each other.

In the present specification, the display device and the image processing method are mainly illustrated as disclosed examples, however, the display device which displays image data processed by an image processing device may be a separate self-luminous display device, a liquid crystal display device, or an electronic paper type display device having an electrophoretic element or the like and any flat panel type display device. In addition, the present invention can be applied from medium to small size to large size devices without any particular limitations.

Other actions and effects different from the actions and effects brought about by the aspects of each embodiment described above, and those obvious from the description of the present specification or those easily predictable by those skilled in the art should naturally be interpreted as being provided by the present invention.

What is claimed is:

1. A display device comprising:
    a display panel arranged with a first subpixel, a second subpixel and a third subpixel, the second subpixel arranged adjacent in a same row direction as the first subpixel, and the third subpixel arranged in a row adjacent to the row direction, and the third subpixel arranged between the first subpixel and the second subpixel; and an image processing circuit converting a first input image signal corresponding to the first subpixel, a second input image signal corresponding to the second subpixel, a third input image signal corresponding to the third subpixel, and a fourth input image signal to a signal for driving a subpixel of the display panel, the fourth input image signal corresponding to any one subpixel among the first subpixel, the second subpixel and the third subpixel, and the fourth input image signal being input between the first input image signal and the second input image signal.

2. The display device according to claim 1, wherein when the first input image signal is a signal which switches ON the first subpixel, the second input image signal is a signal which does not switch ON the second subpixel, and the third input image signal is a signal which does not switch ON the third subpixel, the first subpixel is driven based on the first input image signal and the fourth input image signal.

3. The display device according to claim 1, wherein when the first input image signal is a signal which does not switch ON the first subpixel, the second input image signal is a signal which switch ON the second subpixel, and the third input image signal is a signal which does not switch ON the third subpixel, the second subpixel is driven based on the second input image signal and the fourth input image signal.

4. The display device according to claim 1, wherein when the first input image signal is a signal which does not switch ON the first subpixel, and the second input image signal is a signal which does not switch ON the second subpixel, the third subpixel is driven based on the third input image signal and the fourth input image signal.

5. The display device according to claim 1, wherein the first subpixel, the second subpixel and the third subpixel are subpixels corresponding to the same color.

6. The display device according to claim 5, wherein a fourth subpixel and a fifth subpixel are arranged between the first subpixel and the second subpixel, and the fourth subpixel and the fifth subpixel mutually correspond to different colors and the fourth subpixel and the fifth subpixel correspond to colors different from both the first subpixel and the second subpixel.

7. The display device according to claim 6, wherein the fourth subpixel and the fifth subpixel are subpixels corresponding to green color and a first subpixel corresponding to white color, and the subpixel corresponding to green color is arranged at the center between the first subpixel corresponding to white color and a second subpixel corresponding to white color arranged on the same row as the first subpixel corresponding to white color.

8. An image processing method comprising:
converting a first input image signal corresponding to a first subpixel, a second input image signal corresponding to a second subpixel, a third input image signal corresponding to a third subpixel, and a fourth input image signal to a signal for driving a subpixel of a display panel;
the display panel including the first subpixel, the second subpixel and the third subpixel,
the second subpixel arranged adjacent in a same row direction as the first subpixel,
the third subpixel arranged in a row adjacent to the row direction, and the third subpixel arranged between the first subpixel and the second subpixel,
the fourth input image signal corresponding to any one subpixel among the first subpixel, the second subpixel and the third subpixel, and
the fourth input image signal being input between the first input image signal and the second input image signal.

9. The image processing method according to claim 8, wherein first input image signal which switches ON the first subpixel is input,
the second input image signal which does not switch ON the second subpixel is input,
the third input image signal which does not switch ON the third subpixel is input, and
the first input image signal and the fourth input image signal are converted to a signal for driving the first subpixel.

10. The image processing method according to claim 8, wherein
the first input image signal which does not switch ON the first subpixel is input, the second input image signal which switches ON the second subpixel is input, the third input image signal which does not switch ON the third subpixel is input, and the second input image signal and the fourth input image signal are converted to a signal for driving the second subpixel.

11. The image processing method according to claim 8, wherein the first input image signal which does not switch ON the first subpixel is input, the second input image signal which does not switch ON the second subpixel is input,
the third input image signal and the fourth input image signal are converted to a signal for driving the third subpixel.

* * * * *